(12) United States Patent
Nakahara

(10) Patent No.: US 8,595,727 B2
(45) Date of Patent: Nov. 26, 2013

(54) JOB PROCESSING APPARATUS, JOB PROCESSING APPARATUS CONTROL METHOD, AND STORAGE MEDIUM

(75) Inventor: Hidetaka Nakahara, Kawasaki-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1425 days.

(21) Appl. No.: 11/968,578

(22) Filed: Jan. 2, 2008

(65) Prior Publication Data

US 2008/0189716 A1 Aug. 7, 2008

(30) Foreign Application Priority Data

Feb. 6, 2007 (JP) ................................. 2007-026678

(51) Int. Cl.
*G06F 9/46* (2006.01)
*G06F 3/00* (2006.01)

(52) U.S. Cl.
USPC ........... 718/100; 718/102; 718/104; 718/107; 715/700; 715/733; 715/741; 715/743; 715/750; 715/751

(58) Field of Classification Search
USPC ......................................................... 718/100
See application file for complete search history.

(56) References Cited

U.S. PATENT DOCUMENTS

| | | | | |
|---|---|---|---|---|
| 5,299,296 A | * | 3/1994 | Padalino et al. | 358/1.13 |
| 6,118,546 A | * | 9/2000 | Sanchez et al. | 358/1.6 |
| 6,185,555 B1 | * | 2/2001 | Sprenger et al. | 1/1 |
| 6,795,967 B1 | * | 9/2004 | Evans et al. | 719/310 |
| 7,418,702 B2 | * | 8/2008 | Tsao | 718/1 |
| 2002/0038333 A1 | * | 3/2002 | Evans et al. | 709/107 |
| 2003/0069919 A1 | * | 4/2003 | Takahashi et al. | 709/108 |
| 2006/0164669 A1 | * | 7/2006 | Itou | 358/1.13 |
| 2007/0124737 A1 | * | 5/2007 | Wensley et al. | 719/314 |
| 2010/0211884 A1 | * | 8/2010 | Kashyap et al. | 715/745 |

FOREIGN PATENT DOCUMENTS

| | | | |
|---|---|---|---|
| JP | 2002-335358 | A | 11/2002 |
| JP | 2004-005409 | A | 1/2004 |
| JP | 2004-325470 | A | 11/2004 |
| JP | 2005-301601 | A | 10/2005 |
| JP | 2005-301601 | A | 10/2005 |
| JP | 2006-153981 | A | 6/2006 |

* cited by examiner

*Primary Examiner* — Emerson Puente
*Assistant Examiner* — Charles Swift
(74) *Attorney, Agent, or Firm* — Canon USA, Inc., I.P. Division

(57) ABSTRACT

Information about a job is left correctly on a user-by-user basis while minimizing a work load on a user. In a method for controlling a job processing system, a user logs in to a job processing apparatus having an operation unit and a job processing unit and causes the job processing unit to execute a job using the operation unit. The method includes, permitting, in a state in which a first user has been logged in to the job processing apparatus, a second user to log into the job processing apparatus, storing information about a job as information about the second user in a storage unit, in the case where the second user logs in to the job processing apparatus in the state in which a first user has been logged in to the job processing apparatus, and the second user issues an instruction to the job processing unit to execute the job using the operation unit.

17 Claims, 32 Drawing Sheets

FIG.12

| RECEPTION NO. | DATE AND TIME | JOB NAME | USER NAME | INTERRUPT | NUMBER OF PAGES | PRINT LAYOUT | ONE-SIDED/ TWO-SIDED | NUMBER OF PRINTS | COLOR | CHARGES | ... | RESULT |
|---|---|---|---|---|---|---|---|---|---|---|---|---|
| 001 | 10:00 | JOB A | USER 1 | | 20 | 1 PAGE/ 1 SIDE | ONE-SIDED | 20 | MONOCHROMATIC | 200 | | OK |

FIG.15

PASSWORD ENTRY SCREEN

USER 1 IS CURRENTLY LOGGED IN.
ENTER USER ID AND PASSWORD TO LOG IN
AS DIFFERENT USER.

| USER ID | ~1501 |
| PASSWORD | ~1502 |

CORRECT          OK

USER 1 LOGIN STATUS          SYSTEM MONITOR/SUSPEND ▶

FIG.18

| RECEPTION NO. | DATE AND TIME | JOB NAME | USER NAME | INTERRUPT | NUMBER OF PAGES | PRINT LAYOUT | ONE-SIDED/TWO-SIDED | NUMBER OF PRINTS | COLOR | CHARGES | ... | RESULT |
|---|---|---|---|---|---|---|---|---|---|---|---|---|
| 001 | 10:00 | JOB A | USER 1 | | 20 | 1 PAGE/1 SIDE | ONE-SIDED | 20 | MONOCHROMATIC | 200 | | OK |
| 002 | 10:01 | JOB B | USER 1 | | 80 | 2 PAGES/1 SIDE | TWO-SIDED | 20 | MONOCHROMATIC | 200 | | OK |
| 003 | 10:03 | JOB C | USER 2 | | 80 | 1 PAGE/1 SIDE | ONE-SIDED | 80 | COLOR | 2400 | | OK |

FIG.19

| JOB STATUS | JOB HISTORY |

JOB HISTORY

| RECEPTION NO. | DATE AND TIME | JOB NAME | USER NAME | NUMBER OF PAGES | NUMBER OF PRINTS | CHARGES | RESULT |
|---|---|---|---|---|---|---|---|
| 0001 | 10:00 | JOB A | USER 1 | 20 | 20 | 200 YEN | OK |
| 0002 | 10:01 | JOB B | USER 1 | 80 | 40 | 400 YEN | OK |
| 0003 | 10:03 | JOB C | USER 2 | 80 | 80 | 2400 YEN | OK |

DETAILED INFORMATION    CLOSE

SYSTEM MONITOR/SUSPEND ▶

FIG.28

| ✓ | TYPE | JOB NAME | USER NAME | PAPER | PAGE | STATUS |
|---|---|---|---|---|---|---|
| 1 | 📄 | JOB C (INTERRUPT PRINT) | USER 2 | A4 | 80 | IN PROGRESS |
| 2 | 📄 | JOB A | USER 1 | A4 | 20 | PRINT WAITING... |
| 3 | 📄 | JOB B | USER 1 | A4 | 80 | PRINT WAITING... |

JOB STATUS | JOB HISTORY

JOB STATUS

CLOSE

SYSTEM MONITOR/SUSPEND ▶

| RECEPTION NO. | DATE AND TIME | JOB NAME | USER NAME | INTERRUPT | NUMBER OF PAGES | PRINT LAYOUT | ONE-SIDED/ TWO-SIDED | NUMBER OF PRINTS | COLOR | CHARGES | ... | RESULT |
|---|---|---|---|---|---|---|---|---|---|---|---|---|
| 001 | 10:00 | JOB A | USER 1 | | 20 | 1 PAGE/ 1 SIDE | ONE-SIDED | 20 | MONOCHROMATIC | 200 | | OK |
| 002 | 10:01 | JOB B | USER 1 | | 80 | 2 PAGES/ 1 SIDE | TWO-SIDED | 20 | MONOCHROMATIC | 200 | | OK |
| 003 | 10:03 | JOB C | USER 2 | INTERRUPT | 80 | 1 PAGE/ 1 SIDE | ONE-SIDED | 80 | COLOR | 2400 | | OK |

FIG.30

| JOB STATUS | JOB HISTORY | | | | | | |
|---|---|---|---|---|---|---|---|
| JOB HISTORY | | | | | | | |
| RECEPTION NO. | DATE AND TIME | JOB NAME | USER NAME | NUMBER OF PAGES | NUMBER OF PRINTS | CHARGES | RESULT |
| 0001 | 10:00 | JOB A | USER 1 | 20 | 20 | 200 YEN | OK |
| 0003 | 10:03 | JOB C | USER 2 | 80 | 80 | 2400 YEN | OK |
| 0002 | 10:01 | JOB B | USER 1 | 80 | 40 | 400 YEN | OK |

DETAILED INFORMATION    CLOSE

SYSTEM MONITOR/SUSPEND ▶

JOB PROCESSING APPARATUS, JOB PROCESSING APPARATUS CONTROL METHOD, AND STORAGE MEDIUM

BACKGROUND OF THE INVENTION

1. Field of the Invention

The present invention relates to a job processing system, a job processing system control method, a job processing apparatus, and a storage medium.

2. Description of the Related Art

In a conventional job processing system, a request to log in is issued to a user who wishes to utilize a job processing apparatus that can be operated to execute a copy job or the like (refer to Japanese Patent Application Laid-open No. 2006-153981). In such a job processing apparatus, information about an executed job is stored in association with ID of a user that has logged in. Thus, when history information about the previously executed jobs is displayed later, such information can be displayed discriminately on a user-by-user basis.

Suppose that a first user logs in to a job processing apparatus to perform a job executable by the job processing apparatus as described above. In this situation, suppose a second user executes a job using the same job processing apparatus, since a plurality of users cannot simultaneously use the same resource (for example, printer unit), the second user may be allowed to carry out an operation of the job processing apparatus instead of the first user. However, in this case, information about the executed job is stored as information associated with the first user who is currently logged in to the job processing apparatus. Therefore, although the second user has executed a job, the information is stored as information associated with the first user, and therefore history information concerning the job executed by the second user is not correctly recorded.

In the above described situation, in order to correctly maintain history information concerning the job executed by the second user, it is conceivable that the first user temporarily logs out, and the second user carries out login by using his own user ID. However, in the case where the first user desires to continue a job in the job processing apparatus after the job executed by the second user is completed, the first user is required to carry out login process for the second time, which is cumbersome for the first user and unnecessarily increases the work load.

SUMMARY OF THE INVENTION

An embodiment of the present invention is directed to a job processing system that is capable of correctly storing information relating to a job on a user-by-user basis while reducing a work load on a user as much as possible.

In addition, an embodiment of the present invention is directed to a job processing system that is capable of displaying a setting screen user by user who have logged in and capable of indicating to which user a setting screen belongs.

According to an aspect of the present invention, there is provided a job processing system in which a user logs to a job processing apparatus having an operation unit and a job processing unit and causes the job processing unit to execute a job using the operation unit. The job processing system includes, a login control unit configured to permit in a state in which a first user has logged into the job processing apparatus, a second user to log in to the job processing apparatus, a storage control unit configured to store information about a job as information about the second user in a storage unit, in the case where the second user logs in to the job processing apparatus in the state in which the first user has logged in to the job processing apparatus, and the second user issues an instruction to the job processing unit to execute the job using the operation unit, and a display control unit configured to cause a display unit to display, in the state in which the first user has logged in to the job processing apparatus, a first job setting screen so that it can be recognized that the first user has logged in to the job processing apparatus and to cause the display unit to display, in the state in which the second user has logged in to the job processing apparatus, a second job setting screen so that it can be recognized that the second user has logged in to the job processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments, features, and aspects of the invention and, together with the description, serve to explain the principles of the invention.

FIG. 12 is a view illustrating an example of history information according to an exemplary embodiment of the present invention.

FIG. 15 is a view illustrating an example of a display screen displayed on an operation unit according to an exemplary embodiment of the present invention.

FIG. 18 is a view illustrating an example of history information according to an exemplary embodiment of the present invention.

FIG. 19 is a view illustrating an example of a display screen displayed on an operation unit according to an exemplary embodiment of the present invention.

FIG. 28 is a view illustrating an example of a display screen displayed on an operation unit according to an exemplary embodiment of the present invention.

FIG. 29 is a view illustrating an example of history information according to an exemplary embodiment of the present invention.

FIG. 30 is a view illustrating an example of a display screen displayed on an operation unit according to an embodiment of the present invention.

DETAILED DESCRIPTION OF THE EMBODIMENTS

Various exemplary embodiments, features, and aspects of the invention will be described in detail below with reference to the drawings.

Figure 1:
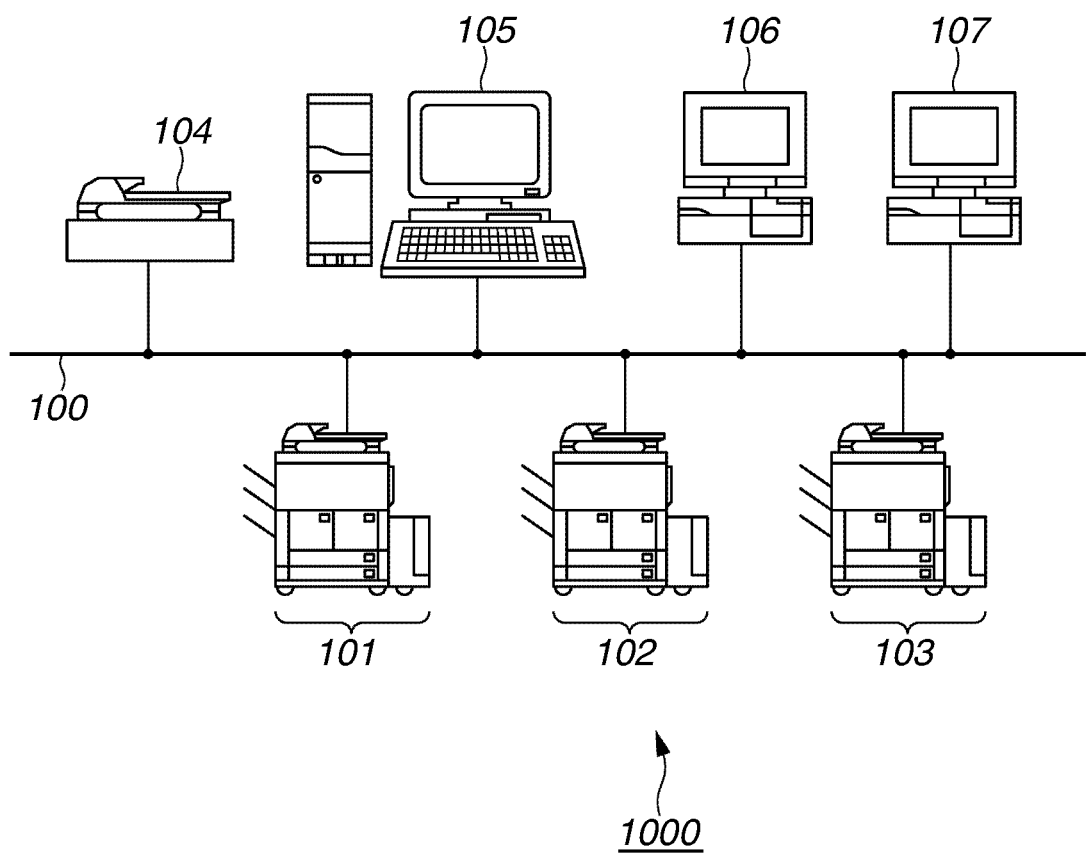
FIG. 1 is a view illustrating a system configuration of an image processing system according to an embodiment of the present invention.

FIG. 1 is a view illustrating a system configuration of an image processing system according to an embodiment of the present invention.

The present embodiment describes a printing system as an example of a job processing system. In addition, the present embodiment describes an image processing apparatus that executes a job using image data, as an example of a job processing apparatus for executing a job.

In FIG. 1, a printing system 1000 includes image processing apparatuses 101 to 103, a scanner device 104, a server computer 105, and client computers 106 and 107, which are connected to each other by a network 100.

An image processing apparatus 101 prints an image read from an image reading unit that the image processing apparatus 101 includes. The image processing apparatus 101 receives image data sent from the server computer 105 or the client computer 106, and prints the received image data on recording paper. Further, the image processing apparatus 101 holds image data read from the image reading unit or image data received via the network 100. Furthermore, the image processing apparatus 101 can transmit the image data to the server computer 105 or the client computer 106, based on a user instruction.

The scanner device 104 transmits a read image of an original to the image processing apparatus 101 via the network 100 to convert the read image into image data and print it. In addition, the scanner device 104 transmits the read image as image data to the server computer 105 or the client computer 106 via the network 100. The server computer 105 or client computer 106 receives the image data transmitted from the scanner 104, and can, for example, apply desired image processing to the image data.

The server computer 105 manages, for example, information about the image processing apparatuses 101 to 103 connected to the network 100 or information about the scanner device 104. For example, the server computer 105 acquires status information from the image processing apparatuses 101 to 103, and transmits the acquired information to the client computer 106, in response to a request for status information from the client computer 106.

The server computer 105 receives from the image processing apparatuses 101 to 103 information about a print job that has been executed at the image processing apparatuses 101 to 103 (such as print date and time of print job, or the number of prints), and stores the received information as history information about the image processing apparatuses 101 to 103. Further, the server computer 105 transmits the stored history information to the client computer 106 in response to a request from the client computer 106.

Further, the server computer 105 receives image data transmitted from the image processing apparatuses 101 to 103 or the scanner device 104 and stores the received data in its memory. The stored image data can be printed later in any one of the image processing apparatuses 101 to 103 connected to the network 100 in response to a request from the client computer 106.

The client computers 106 and 107 transmit, for example, image data subjected to desired image processing to the image processing apparatuses 101 to 103. In addition, at the time of transmitting image data, the client computers 106 and 107 can receive information about print setting which is used at the time of printing the image data (hereinafter, referred to as print setting information) via a printer driver, and transmit information relating to the print setting as a print job in association with the image data.

Figure 2:
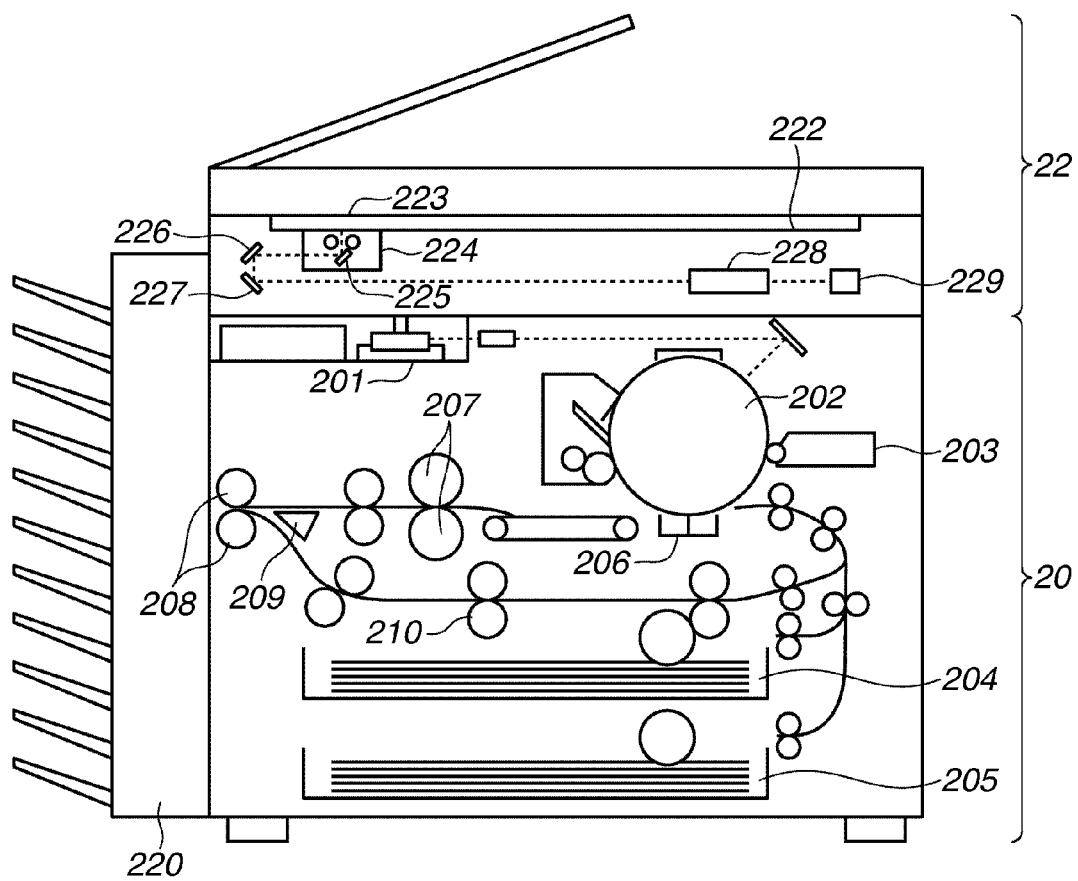
FIG. 2 is a view illustrating a hardware configuration in an image processing apparatus according to an embodiment of the present invention.

Next, a configuration of the image processing apparatus 101 will be described with reference to a cross-sectional view of an image processing apparatus of FIG. 2. FIG. 2 is an example of the image processing apparatus 101 illustrated in FIG. 1, however, the configuration of the image processing apparatus 101 is not limited thereto.

In FIG. 2, the image processing apparatus 101 includes a reader unit 22 and a printer unit 20. In FIG. 2, an original feeding device 101 of the reading unit 22 feeds an original sequentially onto a platen glass 222 one by one from the last page, and ejects the original from the platen glass 222 after completing an original reading operation. When the original is fed onto the platen glass 222, a lamp 223 is lighted, a scanner unit 224 starts to move, and the original is subjected to exposure scanning.

Reflection light from the original is guided to a CCD image sensor 229 via mirrors 225, 226, 227 and a lens 228. The scanned original image is read by the CCD image sensor 229, and after predetermined processing has been applied, image data output from CCD 229 is transferred to the printer unit 20 to be printed. In addition, the image data is stored in a HDD 309 which will be described later.

A laser driver (not shown) of the printer unit 20 drives a laser beam emitting unit 201 and emits laser beam from light emitting unit 201 responsive to the image data output from the reader unit 22. The laser beam is emitted to a photosensitive drum 202, and a latent image is formed according to the laser beam on the photosensitive drum 202. A developing device 203 attaches developing agent to the latent image on the photosensitive drum 202. Then, in a timing synchronized with emitting of the laser beam, recording paper is fed from one of a cassette 204 and a cassette 205. The recording paper is transported to a transfer unit 206 and the developing agent adhering to the photosensitive drum 202 is transferred onto recording paper. The developing agent on the recording paper is transported to a fixing unit 207, and is fixed on the recording paper by heat and pressure of the fixing unit 207. The recording paper having passed through the fixing unit 207 is ejected by an ejection roller 208. A sorter 220 stores the ejected recording paper in an individual bin while sorting out printed papers. The sorter 220 ejects the recording papers onto a top bin in the case where sorting is not set.

Further, in the case where double-sided printing is set, after recording paper is transported to the ejection roller 208, a rotational direction of the ejection roller 208 is reversed, and the recording paper is guided to a re-feed transport passage 210 by a flapper 209. The recording paper guided to the re-feed transport passage 210 is fed to the transfer unit 206 in the timing as described above, and double-sided printing is carried out.

Next, a configuration of the image processing apparatus 101 will be described with reference to a block diagram of an image processing apparatus of FIG. 3.

Figure 3:
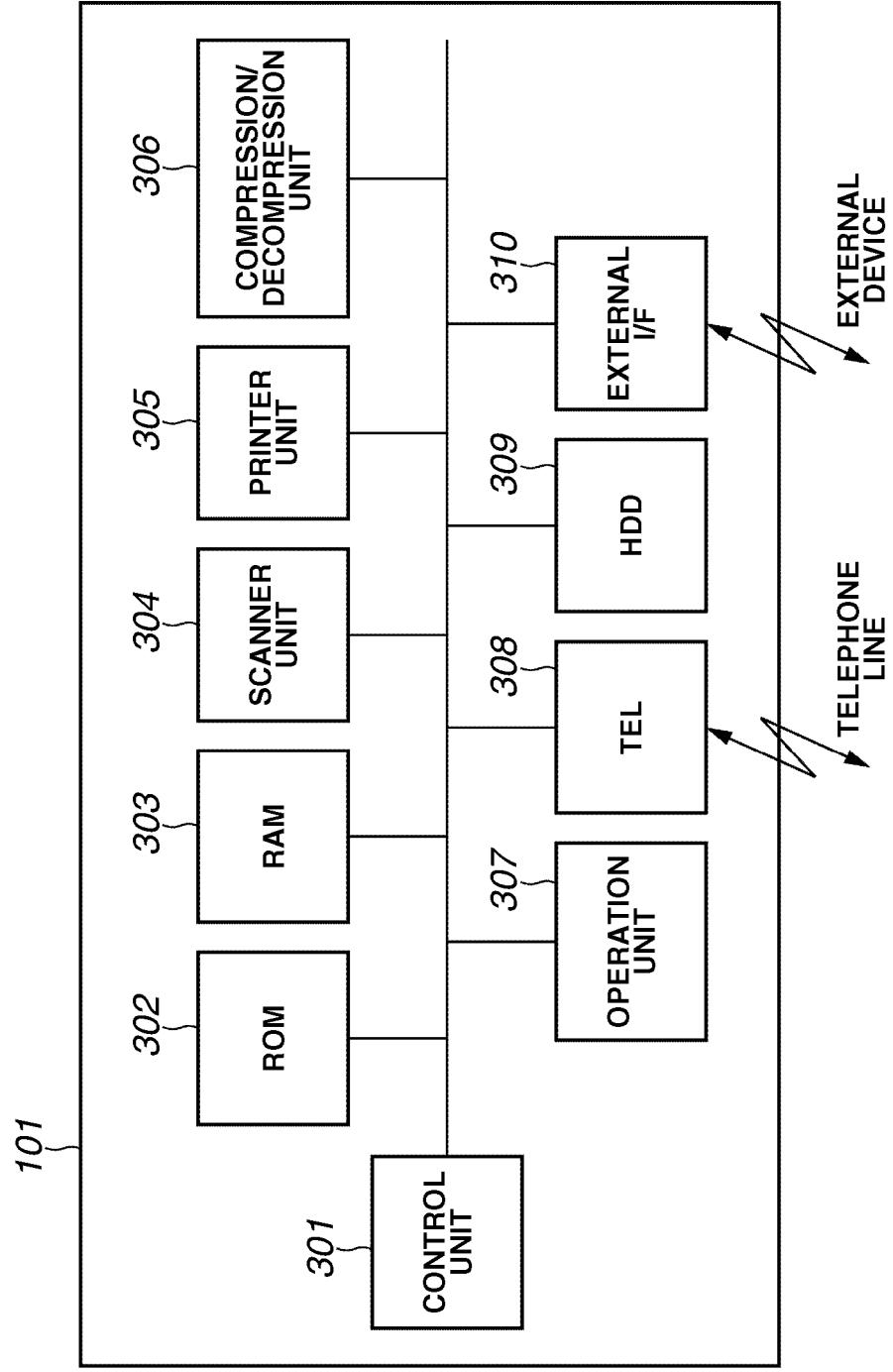
FIG. 3 is a block diagram illustrating a configuration of an image processing apparatus according to an embodiment of the present invention.

In FIG. 3, the image processing apparatus 101 includes a control unit 301 (referred to as a controller unit as well), a ROM 302, a RAM 303, a scanner unit 304, a printer unit 305, and a compression/decompression unit 306. In addition, the image processing apparatus 101 includes an operation unit 307 (referred to as a display unit or a UI unit), a TEL 308, the HDD 309, and an external interface (I/F) 310.

The control unit 301 carries out a variety of control based on programs stored in the ROM 302 of the image processing apparatus 101.

The ROM 302 stores programs executed by the control unit 301. For example, the ROM 302 stores programs such as a print program for causing the printer unit 305 to carry out print processing and a display control program for causing the operation unit 307 to display a screen.

The RAM 303 includes storage devices such as SRAM and DRAM, stores variables or data used by the control unit 301 to execute a program, and is mainly utilized as a work buffer of the control unit 301.

The scanner unit 304 corresponds to the reader unit 22 as described above. The scanner unit 304 reads an original, and converts the read original to image data, based on an instruction from the control unit 301. The printer unit 305 corresponds to the printer unit 20 as described above and prints image data onto recording paper based on an instruction from the control unit 301. The scanner unit 304 and the printer unit 305 are employed jointly by a plurality of users to execute job processing.

The compression/decompression unit 306 compresses or decompresses the image data.

The operation unit 307 includes a keyboard, a touch panel, an LCD, an LED and the like. An equipment user (hereinafter, referred to as user) carries out a variety of operations such as print setting and print job execution instruction, and the operation unit 307 displays or notifies information such as a print status or warning to the user. Operating unit 307 is also referred to as UI unit or display unit. A detailed description will be given later with reference to FIG. 4.

The TEL 308 includes a modem (modulator/demodulator), NCU (network control unit) and the like. The TEL 308 carries out facsimile transmission/receiving via a telephone line.

The HDD 309 stores a variety of data relating to print processing or authentication processing. For example, the HDD 309 stores image data of an original read by the scanner unit 304 or image data received from an external device via the external interface (I/F) 310. In addition, the HDD 309 can store a plurality of user IDs and passwords or the like on a user-by-user basis in order to authenticate a user. Further, the HDD 309 stores setting information about a job setting screen displayed at the time of logging in on a user-by-user basis (hereinafter referred to as print setting screen when a display screen for making settings relating to printing is described). In accordance with the setting information, the control unit 301 displays an initial screen at the time of logging in on the operation unit 307. The different setting information can be stored as initial screen information for each user. A detailed description will be given below.

The external interface (I/F) 310 performs interface control for making communication with external devices connected via the network 100, such as the client computers 106 and 107, the server computer 105, and the scanner device 104. The image processing apparatus 101 receives image data from an external device via the external interface (I/F) 310. In addition, the external interface (I/F) 310 can accept a print request from the client computers 106 and 107 or the server computer 105. Further, the image processing apparatus 101 transmits the image data stored in the HDD 309 to an external device via the external interface (I/F) 310.

Figure 4:
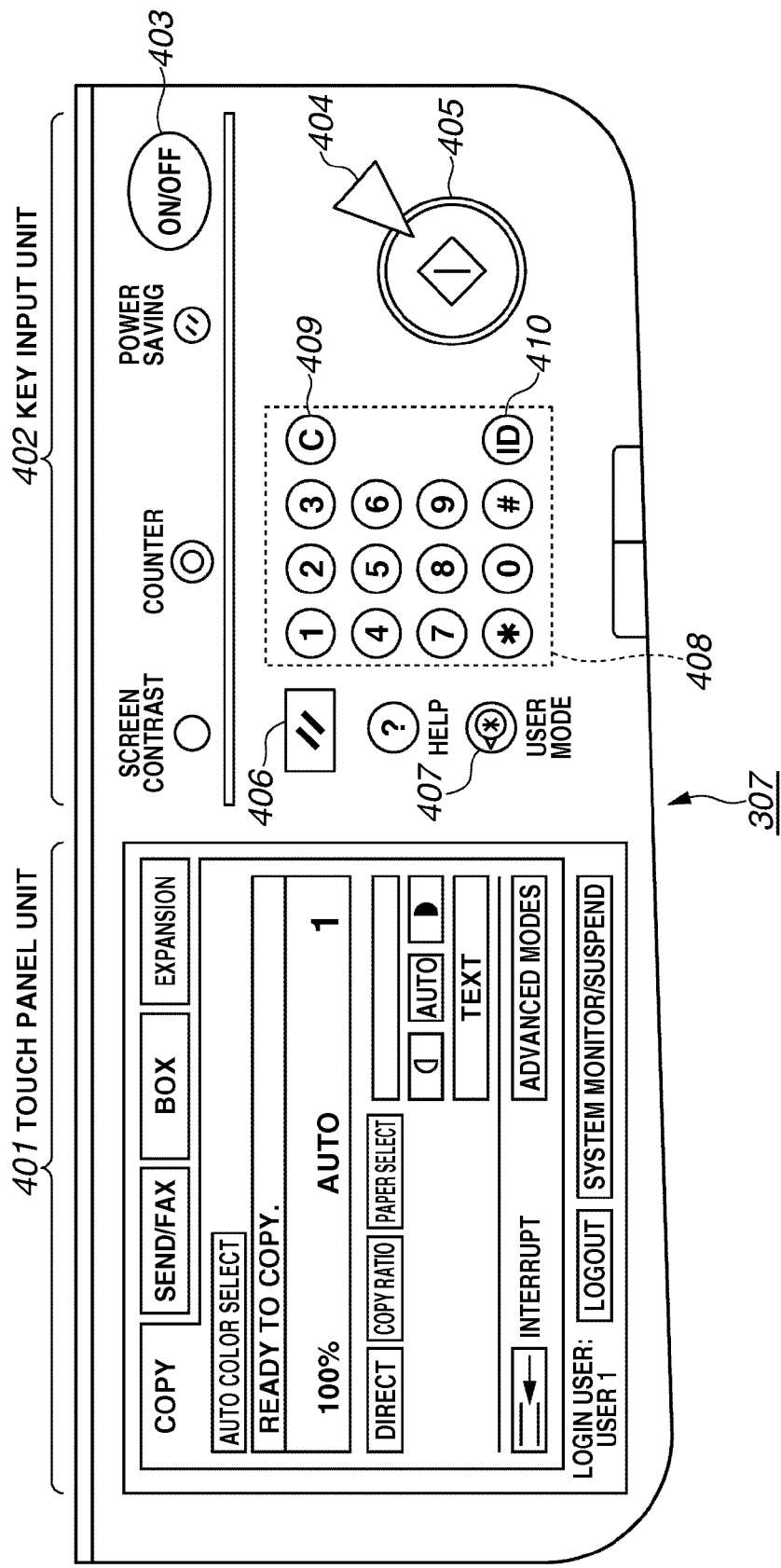
FIG. 4 is a view illustrating a user's operating screen of an image processing apparatus according to an embodiment of the present invention.

Next, the operation unit 307 of the image processing apparatus 101 shown in FIG. 3 will be described with reference to FIG. 4.

Operating unit 307 includes a key input unit 402 that accepts user operation via hardware keys, and a touch panel unit 401 that is capable of displaying software keys (display keys) and accepts a user's operation via the software keys.

First, a key input unit 402 will be described below. As shown in FIG. 4, the key input unit 402 is provided with an operation unit power switch 403. In response to pressing of the switch 403 by the user, the control unit 301 selectively switches between a standby mode (normal operation state) and a sleep mode (state in which power consumption is restrained). The control unit 301 accepts a user's operation of the switch 403 in a state where a main power switch (not shown) for supplying power to an entire system is turned ON.

A start key 405 serves as a key for accepting an instruction from a user for starting processing such as a copying function with the scanner unit 304, and transmitting image data stored in the HDD 309 to an external device via the external interface (I/F) 310, in the image processing apparatus 101.

A stop key 404 serves as a key for accepting an instruction for stopping processing of a print job received from a user. Ten numeric keys 408 serve as keys that allow a user to execute a variety of number settings. A clear key 409 serves as a key for deleting an input value such as user ID or password, for example, that is input by a user via the ten numeric keys 408.

A reset key 406 serves as a key for disabling a variety of settings provided by a user with respect to a job of a print object, and for accepting from a user an instruction for resetting to a default state. A user mode key 407 serves as a key for moving a current screen to a system setting screen on a user-by-user basis.

An ID key 410 is employed to carry out user authentication. When the ID key 410 is pressed, the control unit 301 displays a login screen on the touch panel unit 401. Then, the control unit 301 carries out user authentication with a user ID and password input via the login screen.

Next, the touch panel unit 401 will be described below. The touch panel unit 401 includes an LCD (Liquid Crystal Display unit) and a touch panel display including a transparent electrode attached on the LCD.

The touch panel unit 401 has a function of accepting a variety of settings from an operator and a function of providing information to the user. For example, when it is sensed that a user has pressed a portion corresponding to a key displayed on the LCD, the control unit 301 executes processing corresponding to the pressed display key based on the display control program stored in the ROM 302. A detailed description of a screen displayed on the touch panel unit 401 will be given below.

First Exemplary Embodiment

A flow of print processing using the image processing apparatus 101 will be described with reference to a schematic view shown in FIG. 5.

In the present embodiment, it is presumed that a user who utilizes the image processing apparatus 101 is required to log in to the image processing apparatus 101.

Figure 5:
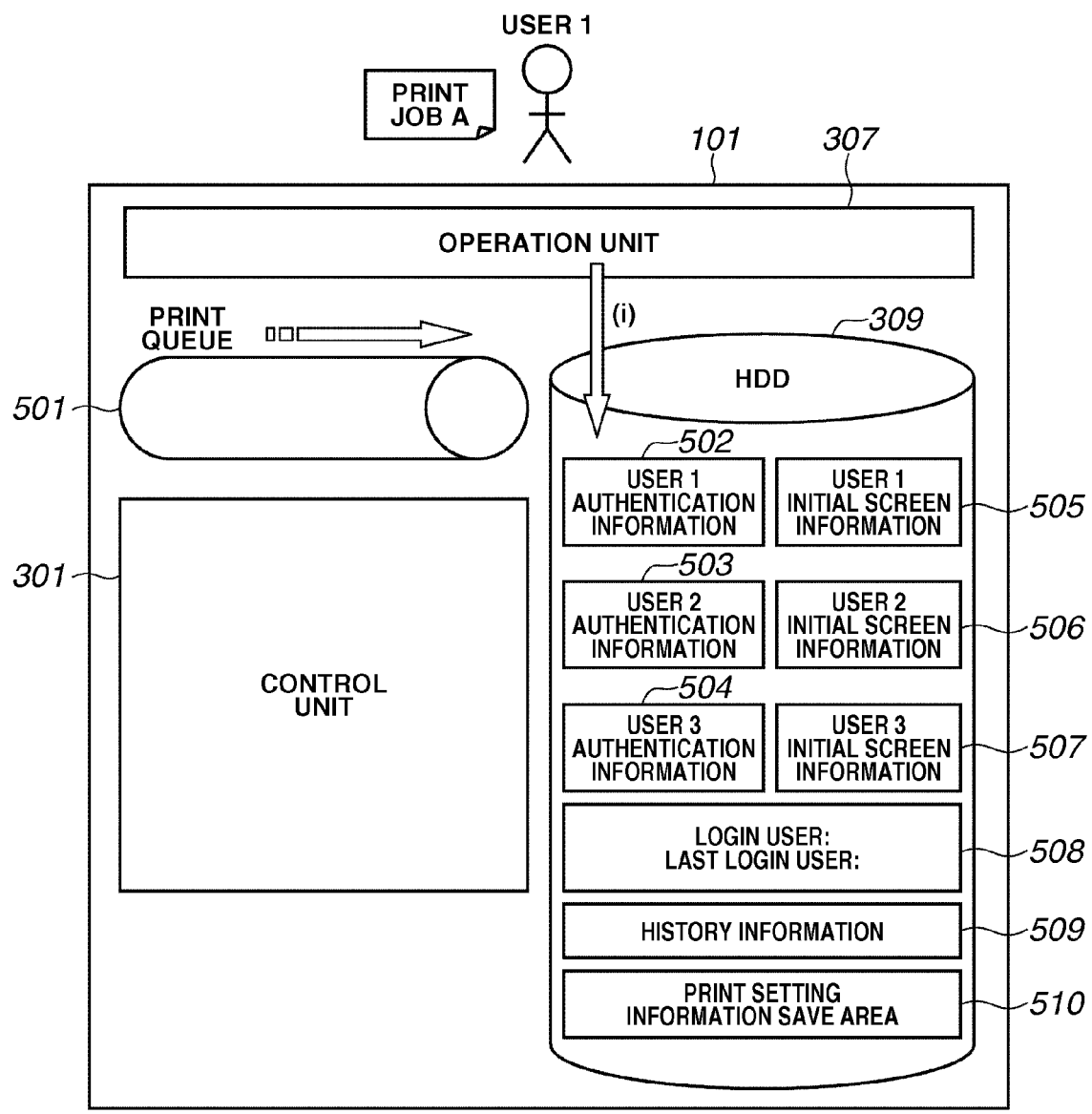
FIG. 5 is a schematic view illustrating a control example of an image processing apparatus according to an embodiment of the present invention.

In FIG. 5, first, the control unit 301 accepts user ID and password to be input by a user 1 (i.e., one example of a first user) to log in to the image processing apparatus 101. The control unit 301 of the image processing apparatus 101 temporarily stores the input user ID and password in the HDD 309, as indicated by arrow (i) shown in FIG. 5. Then, the control unit 301 compares the stored ID and password with authentication information 502 to 504 registered in advance in the HDD 309, determines whether the information coincide with each other, and permits login to the user 1 in the case where the information coincide. When login is successful, the user 1 can execute a job (e.g., print job) using the image processing apparatus 101.

At this point, the control unit 301 determines, based on information stored in a login user storage area 508, whether there exists another user who is currently logged in to the image processing apparatus 101. In the present example, suppose that the control unit 301 has determined that there is no other user who has logged in to the image processing apparatus 101 according to the information stored in the login user storage area 508.

Figure 6:
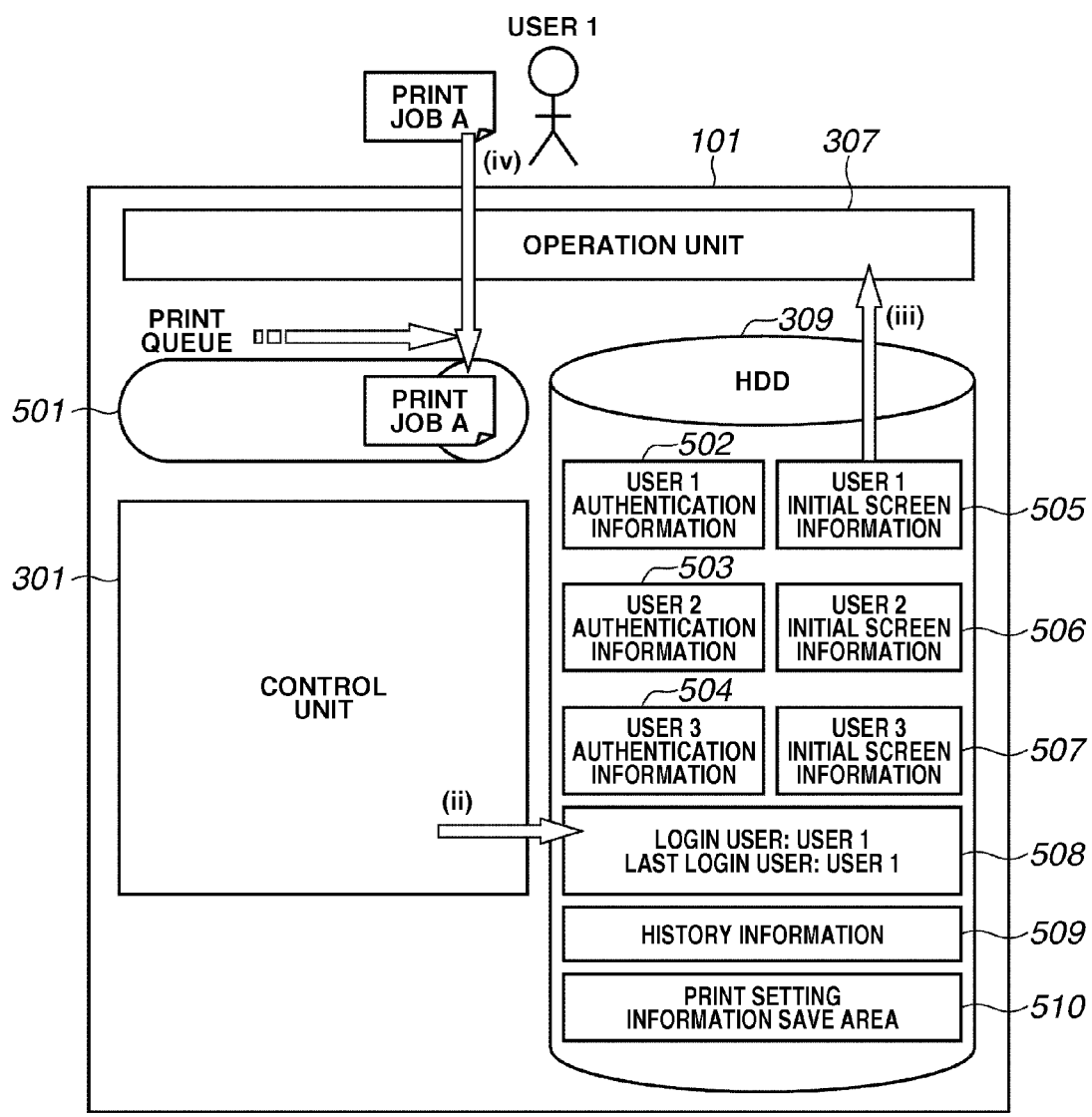
FIG. 6 is a schematic view illustrating an exemplary control of an image processing apparatus according to an embodiment of the present invention.

Then, the control unit 301 stores, in the login user storage area 508 of the HDD 309, information indicating that a user who has logged in to the image processing apparatus 101 is the user 1, as indicated by arrow (ii) shown in FIG. 6. In addition, the control unit 301 also registers in the login user storage area 508 that a user who has logged in lastly is the user 1. In this state, when executing of a print job is completed, the control unit 301 treats history information about the executed print job as history information about the user 1, and stores the history information in a history information storage unit 509 of the HDD 309.

Further, the control unit 301 displays a print setting screen for the user 1 on the operation unit 307 based on initial screen information 505 about the user 1 registered in the HDD 309, as indicated by arrow (iii) shown in FIG. 6. The user 1 can register, in the HDD 309, a frequently used print setting condition (e.g., printing of five copies or double-sided printing) as initial screen information, which frees the user from inconvenience that occurs when a print setting is made after login. With respect to the initial screen information 505 to 507, for example, the control unit 301 can display a register key on the touch panel unit 401 so that the print setting at the time when the register key is pressed, can be registered as initial screen information. In this manner, a user can freely register initial screen information.

When a print setting screen for the user 1 is displayed on the operation unit 307, the control unit 301 accepts print setting via a print setting screen from the user 1 and temporarily stores information about the accepted print setting (hereinafter, also referred to as print setting information) in the HDD 309. Then, when the start key 405 is pressed, for example, the control unit 301 accepts a request for a print job (hereinafter, referred to as print job A) according to the stored print setting, and arranges the print job A at the head of a print queue 501, as indicated by arrow (iv) shown in FIG. 6.

If a print job being executed or in a waiting state does not exist in the print queue 501, the control unit 301 starts execution of the print job A. If a print job being executed or in a waiting state exists in the print queue 501, the print job A is arranged in the print queue 501 such that the print job A is executed after these print jobs are executed.

Figure 7:
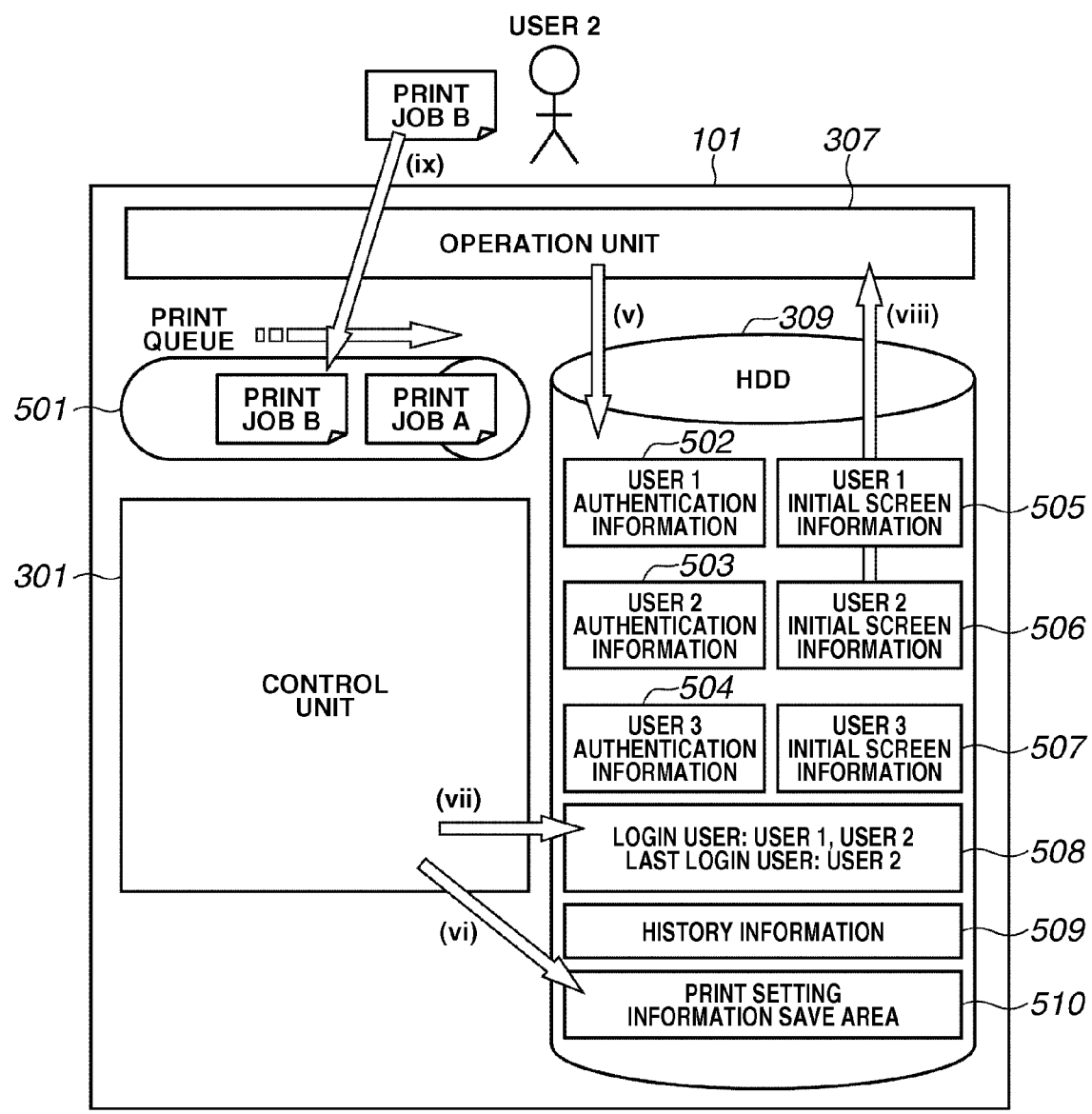
FIG. 7 is a schematic view illustrating an exemplary control of an image processing apparatus according to an embodiment of the present invention.

Then, when a print setting screen for the user 1 is displayed, if a user 2 (i.e., one example of a second user) desires to carry out processing of a print job (hereinafter, referred to as print job 2) in the image processing apparatus 101, the user 2 presses the ID key 410. When the ID key 410 is pressed, the control unit 301 displays a login screen on the operation unit 307. ID key 401 can also be provided such that it is displayed on a print setting screen. When a login screen is displayed on the operation unit 307, the user 2 inputs user ID and password via the login screen. The image processing apparatus 101 temporarily stores the input user ID and password in the HDD 309, as indicated by arrow (v) shown in FIG. 7, compares the stored ID and password with the authentication information 502 to 504 registered in advance in the HDD 309, determines whether the information coincide with each other, and permits login of the user 2 in the case where the information coincide. When the login is successful, the user 2 can execute print processing using the image processing apparatus 101.

If the login of the user 2 is permitted, the control unit 301 determines, based on information stored in the login user storage area 308, whether there exists another user who is currently logged in to the image processing apparatus 101 when the user 2 logged in. In the present case, suppose that the control unit 301 has determined that the user 1 is currently logged in to the image processing apparatus 101, namely, that there exists another user who is simultaneously logged in to the same image processing apparatus 101.

If it is determined that there exists another user (i.e., the user 1 who has logged in to image processing apparatus 101), the control unit 301 stores the print setting information received from the user 1 and temporarily stored in the HDD 309, as indicated by arrow (vi) shown in FIG. 7, in a print setting information save area 510.

Further, the control unit 301 stores, in the login user storage area 508 of the HDD 309, information indicating that users who are logging in to the image processing apparatus 101 are the user 1 and user 2. Further, the control unit 301 registers, in the login user storage area 508 of the HDD 309, that a user who has lastly logged in to the image processing apparatus 101, is the user 2, as indicted by arrow (vii) shown in FIG. 7. In this state, when executing of a print job is completed, the control unit 301 treats history information about the executed print job as history information about the user 2, and stores the history information in a history information storage unit of the HDD 309.

Further, the control unit 301 displays a print setting screen for the user 2 on the operation unit 307 based on initial screen information about the user 2 registered in the HDD 309, as indicated by arrow (viii) shown in FIG. 7. The user 2 can simplify print setting procedures after login, for example, by setting a frequently used print setting condition as initial screen information in the HDD 309. Startup screen information different from the user 1 can be stored as initial screen information for the user 2

Then, the user 2 makes a print request for the print job B by operating a print setting screen on the operation unit 307. In that case, if a print job being executed or in a waiting state does not exist in the print queue 501, the control unit 301 starts execution of the print job B. If print jobs being executed or in a waiting state exist in the print queue 501, the print job B is arranged in the print queue 501 such that the print job B is executed after the previously requested print jobs are executed. In the present case, because the print job A is being executed, the control unit 301 enters the print job B into a print queue such that the print job B is executed after executing of print processing of the print job A is completed, as indicated by arrow (ix) shown in FIG. 7. When the executing of the print job B is completed, the control unit 301 treats history information about print job N as execution history information about the user 2, and stores the history information in HDD 209.

This history information is stored in a history information storage area 509 of the HDD 309. The control unit 301 stores the history information on a user-by-user basis in formats as shown in FIG. 12 and FIG. 18 which will be described below.

When the executing of the print job B is completed, the control unit 301 causes the user 2 to automatically log out. Then, the control unit 301 displays a print setting screen for the user 1 on the operation unit 307, based on print setting information about the user 1 stored in the print setting information save area 510. According to an embodiment, the print setting information set by the user 1 is not cleared by login processing of the user 2, which frees the user 1 from inconvenience that occurs when a print setting has to be made again even after the user 2 logs out. In this case, logout processing is automatically carried out. However, for example, a logout key can also be provided on a print setting screen, and when the logout key is pressed, logout can be carried out.

Thus, even when a plurality of users is permitted to simultaneously log in to the same image processing apparatus, print history information can be correctly recorded and stored for each user if the control is performed as described above. In other words, if a plurality of users executes a print job in the printer unit 305 serving as a common resource for executing job processing, it is possible to specify a user who has instructed execution of the job, and store print history information about the user. In addition, the print setting information set by a user is not cleared by login of another user which frees the user from inconvenience that occurs when a print setting has to be made again.

The control of the image processing apparatuses according to the present embodiment has been described with reference to schematic views of FIG. 5 to FIG. 7. Its detailed description will be given with reference to a flow chart illustrated in FIG. 8, and examples of a display screen on the operation unit 307 illustrated in FIGS. 9 to 20.

Figure 8:
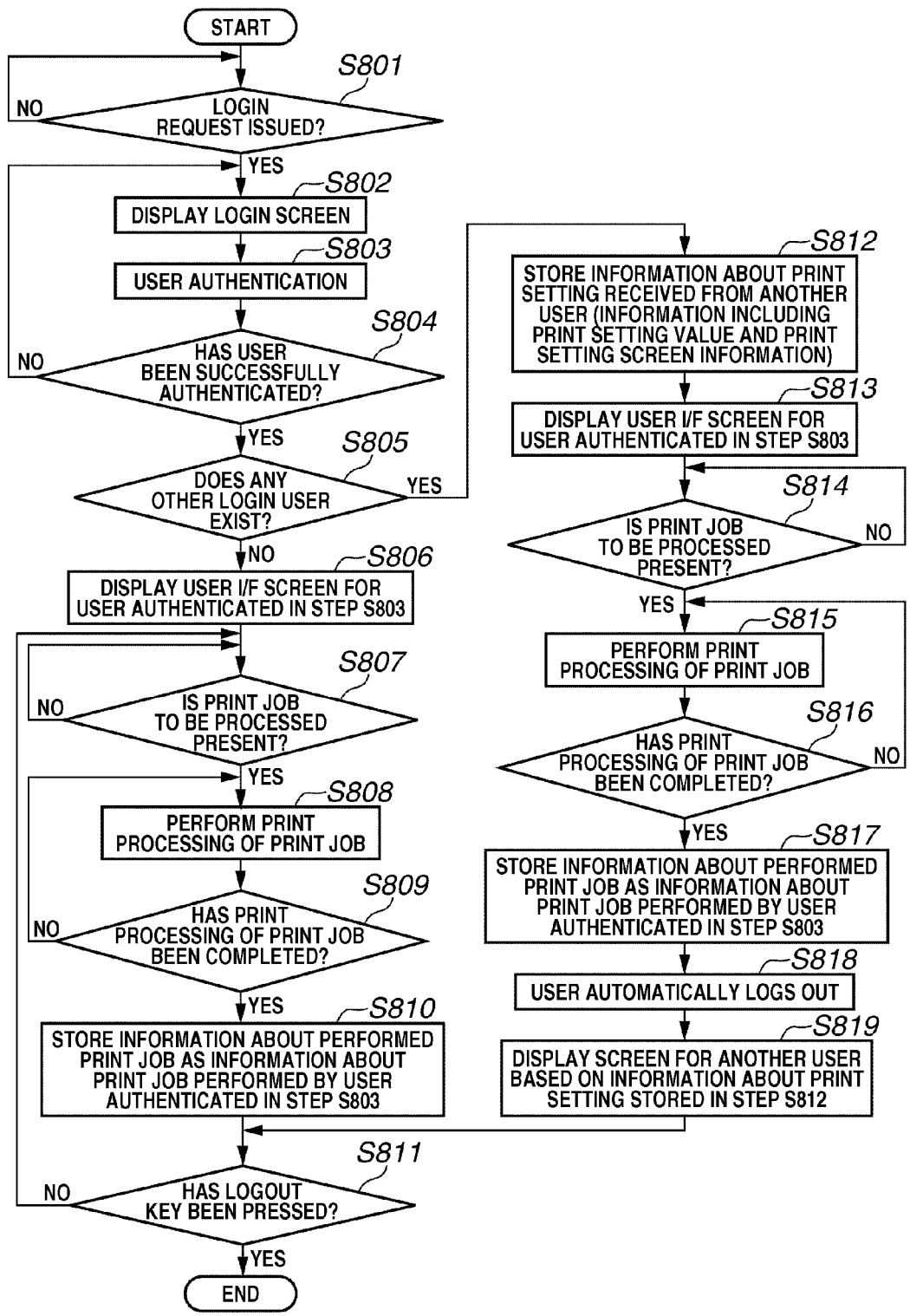
FIG. 8 is a flow chart illustrating an example of data processing procedures according to an embodiment of the present invention.

FIG. 8 is a flow chart illustrating an example of control proceeding in an embodiment of the present invention.

In step S801, the control unit 301 determines whether a login request has been issued. For example, if the ID key 410 is pressed, the control unit 301 determines that a login request has been issued.

Figure 9:
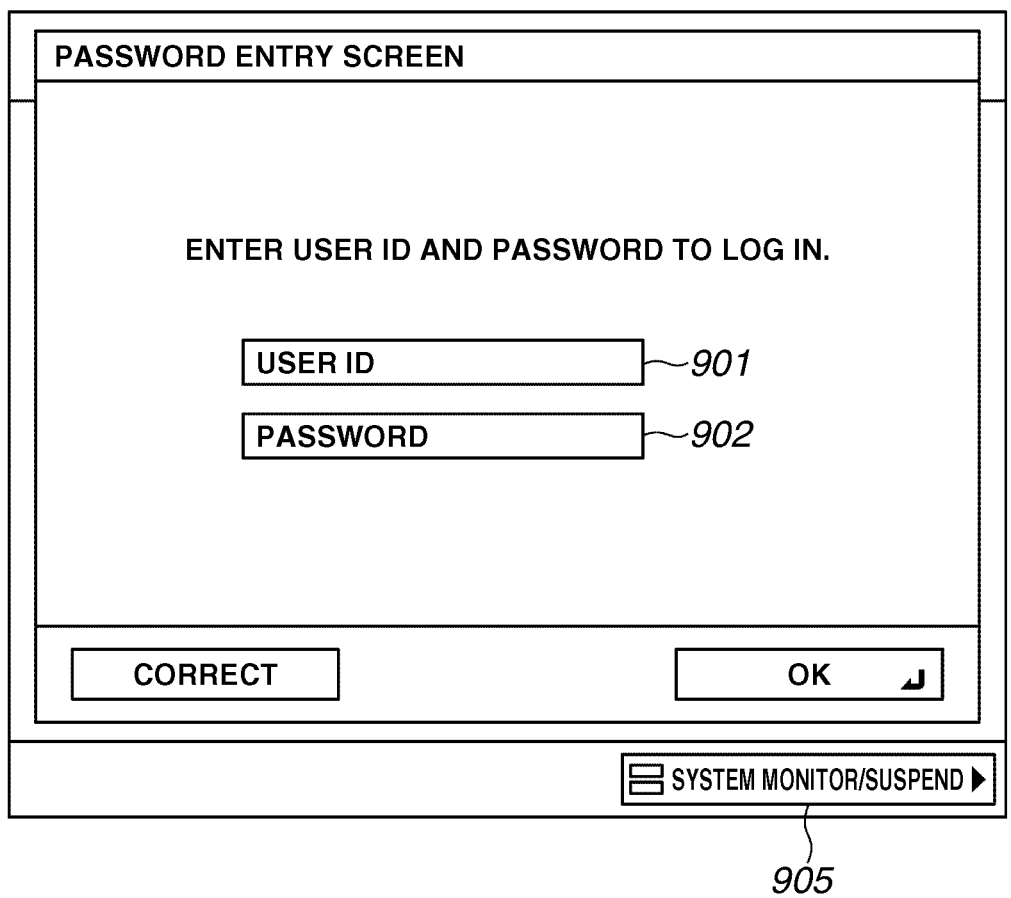
FIG. 9 is a view illustrating an example of a display screen displayed on an operation unit according to an exemplary embodiment of the present invention.

Then, in step S802, the control unit 301 (referred to also as a controller) displays a login screen on the operation unit 307 as shown in an example of FIG. 9. The operating unit 307 is provided with a touch panel on its surface. When the touch panel is pressed, control of keys displayed at that portion is carried out.

In step S803, if it is detected that an OK key 905 of FIG. 9 is pressed via a touch panel of the operation unit 307, the control unit 301 carries out user authentication based on user ID and password input in a user ID field 901 and a password field 902.

Then, in step S804, if it is determined that the input ID and password are coincident with those registered in the HDD 309, the control unit 301 carries out next control. The control unit 301 stores information indicating a user who has logged in to the image processing apparatus 101, for example, the input ID, in the longitude storage area 508 of the HDD 309. In addition, the control unit 301 stores information indicating a user who has lastly logged in to the image processing apparatus 101, for example, the input ID, in the login user storage area 508 of the HDD 309. Then, the processing proceeds to step S805. On the other hand, if it is determined that the input user ID and password coinciding with those stored in the HDD 309 are not registered in step S804, the control unit 301 returns the processing to step S802.

In step S805, the control unit 301 determines whether there exists another user who has logged in to the image processing apparatus 101 other than the user authenticated in step S803. If it is determined that another user exists, the processing proceeds to step S812. The processing in step S812 or subsequent steps will be described below.

On the other hand, if it is determined that such another user does not exist in step S805, the control unit 301 advances the processing to step S806.

Figure 10:
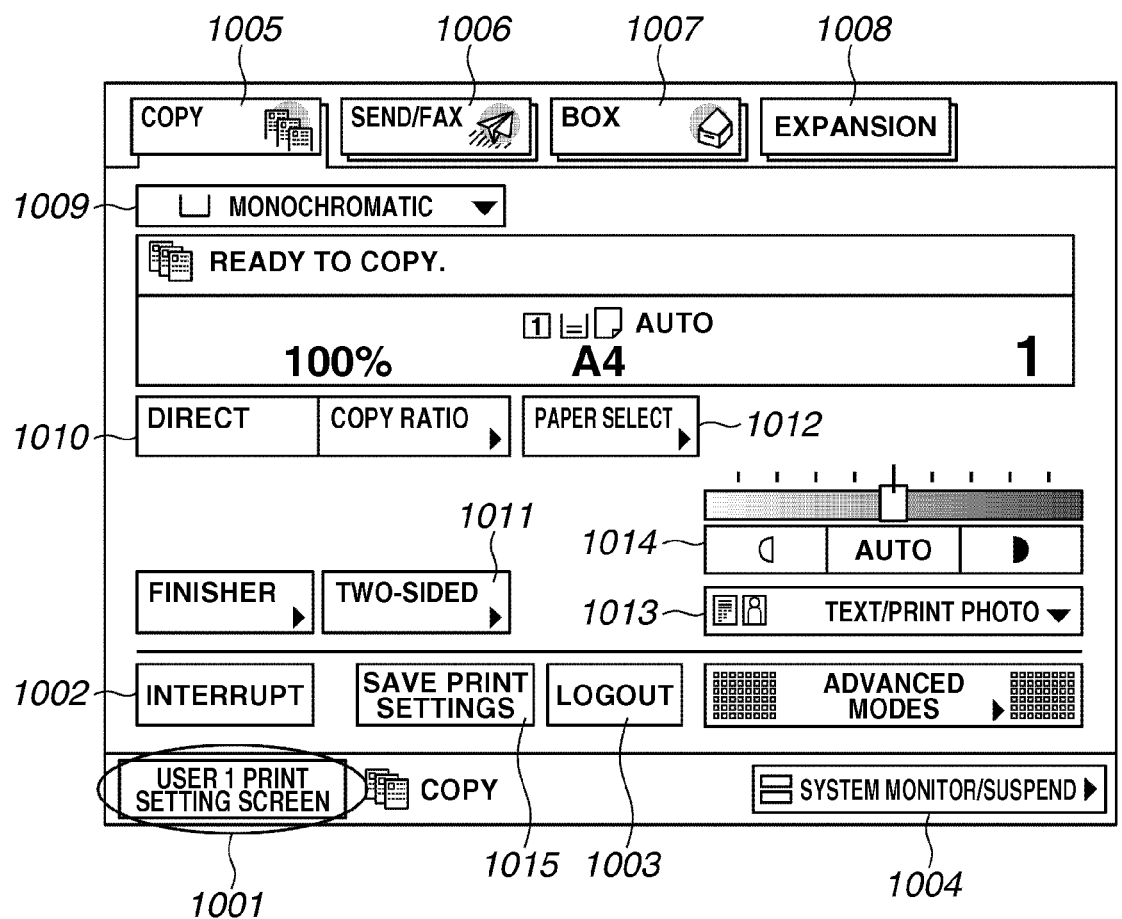
FIG. 10 is a view illustrating an example of a display screen displayed on an operation unit according to an embodiment of the present invention.

In step S806, the control unit 301 displays a screen for a user authenticated in step S803 as shown in FIG. 10 on the operation unit 307, according to the input user ID based on initial screen information about the user stored in the HDD 309 in association with the user ID. In the following description, it is assumed that a user who has logged in here is the user 1 as described before with reference to the schematic view.

A display screen of FIG. 10 will be briefly described.

In FIG. 10, the control unit 301 displays, in a login user display area 1001, a name of a user who has logged in to the image processing apparatus 101. Thus, a user can recognize who is using the image processing apparatus 101. In this example, because a user who has logged in is the user 1, "login user: user 1" is displayed at the login user display unit 1001.

An interrupt key 1002 is pressed in the case where print processing of a print job being executed is interrupted, and a print job other than the interrupted print job is executed.

If a copy tab 1005 on the touch panel unit 401 is pressed by a user, the control unit 301 displays a job setting screen for a copy job on the touch panel unit 401 which the image processing apparatus 101 has. A job setting screen relating to a copy job is also referred to as a copy setting screen or a print setting screen. In the case where a send/facsimile tab 1006 has been pressed by a user, the control unit 301 displays, on the touch panel unit 401, a job setting screen for providing settings relating to a data transmission job using a function such as an E-mail transmission function or a facsimile transmission function, which the image processing apparatus 101 has. The E-mail transmission function and the facsimile transmission function are referred to together as a data transmission function. A job setting screen relating to a data transmission job is also referred to as a data transmission setting screen. If a box tab 1007 is pressed by a user, the control unit 301 displays, on the touch panel unit 401, a job setting screen relating to a box job that utilizes a box function, which the image processing apparatus 101 has. A job setting screen relating to a box job is also referred to as a box setting screen.

The box function is a function utilizing a plurality of data storage areas (hereinafter, referred to as box) discriminated for each user, that are virtually provided in the HDD 309. For example, a user can select an arbitrary box from among a plurality of boxes, and store, in the selected box, image data of an original read by the scanner unit 304 of the image processing apparatus 101. Further, data such as image data received from an external device via an external interface (I/F) unit 310 is stored in a box specified by the user based on a user instruction input from an operation unit of the external device. The control unit 301 outputs the image data stored in a box in an output mode desired by the user based on the user instruction input from the operation unit 307. For example, the data is printed by the printer unit 305 or is transmitted to an arbitrary external device.

In this way, the control unit 301 causes the operation unit 307 to display a box job setting screen when a user presses the box tab 1007 so that the user can execute a variety of box operations. In addition, when the user presses an extension tab 1008 of the operation unit 307 of FIG. 6, the control unit 301 causes the operation unit 307 to display a screen for operating an extension function other than a copy function, a transmit/facsimile function, and a box function.

In the case where a user presses a system status key 1004, a display screen is displayed on the operation unit 307 to notify to a user a state of an image processing apparatus, a job execution state, and history information.

A color selection setting key 1009 is a display key that enables a user to select color copy, monochrome copy, or auto selection in advance. A copy ratio setting key 1010 is a key for displaying, on an operation unit 401, a setting screen enabling a user to execute copy ratio settings such as same size, expansion, and reduction.

When a user presses a two-sided key 1011, the control unit 301 causes the operation unit 307 to display a screen so that the user can determine single-sided printing or double-sided printing at the time of print processing of a target job. Further, in the case where a user presses a paper selection key 1012, the control unit 301 displays a screen on the operation unit 307 so that the user can set a paper feed unit or paper size and paper type (medium type), which are required for print processing. Furthermore, if a user presses a print mode setting key 1013, the control unit 301 causes operation unit 401 to display a screen so that the user can select an image processing mode suitable for an original image such as a character mode or a photographic mode. In addition, a user can operate a contrast setting key 1014 to adjust the contrast of an output image of a job targeted for printing.

Further, when a print setting saving key 1015 is pressed, the control unit 301 stores in the HDD 309 a print setting value being set when the key is pressed, and print settings provided when a print setting screen is pressed, as initial screen information about a user who is in a login state. For example, in the case where the print setting saving key 1015 is pressed when five copies and double-sided printing are set and the user 1 has logged in, the control unit 301 stores the set print setting screen as initial screen information 505 about the user 1. At this time, the control unit 301 stores not only information about the set print setting screen but also a print setting value (settings such as double-sided printing or five copies) in the HDD 309. When the user 1 has temporarily logs out, and logs in to an image processing apparatus again, the control unit 301 displays screen setting to print five copies in double-sided printing on the operation unit 307 based on initial screen information.

In this way, a user can set a print condition by making an operation via a touch panel while checking a print setting screen displayed on the operation unit 307. Further, a user can request an image processing apparatus to print image data under a set print condition by pressing the start key 405. Upon the receipt of the user's instruction, the control unit 301 enters information about print processing of the instructed image data (image data or print setting information) as a print job into the print queue 501, and sequentially executes print processing of a print job that exists in a print queue.

When the control unit 301 displays a screen as shown in FIG. 10 in step S806, then in step S807, the control unit 301 determines whether a print job requested by a user via the print setting screen as described above, or a print job transmitted from the client computer 106 exists in the HDD 309. In the case where no print job exists, the control unit 301 repeats processing in step S807. In the case where a print job exists, the control unit 301 advances the processing to step S808, and executes print processing of the print job. Hereinafter, the print job requested by the user 1 is referred to as a print job A.

Figure 11:
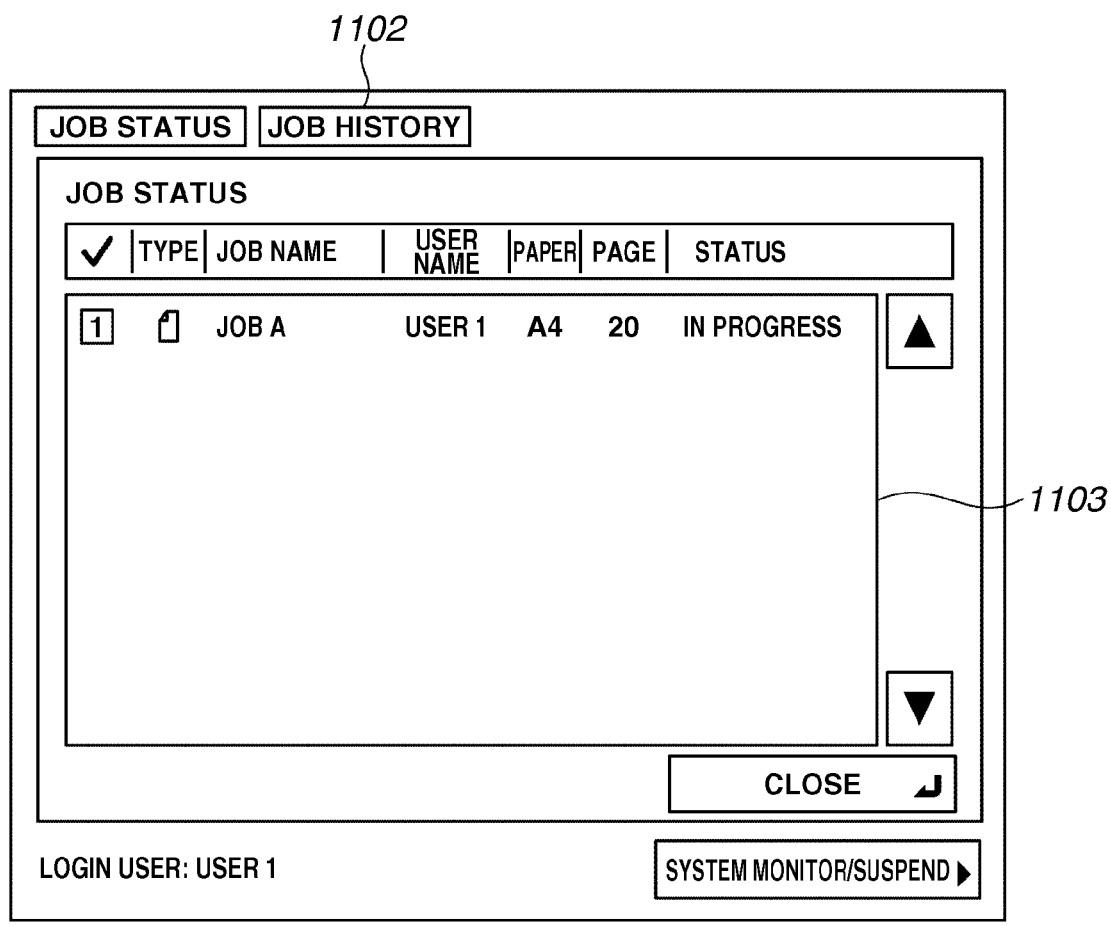
FIG. 11 is a view illustrating an example of a display screen displayed on an operation unit according to an exemplary embodiment of the present invention.

When the print job A is executed, if the system status key 1004 shown in FIG. 10 is pressed, the control unit 301 displays a job status screen as shown in FIG. 11 on the operation unit 307. On the screen shown in FIG. 11, the control unit 301 displays information about a print job entered into the print queue 501. The control unit 301 displays in a job status display area 1103 of FIG. 11 the print job A being executed, which the user 1 requests to print.

Figure 13:
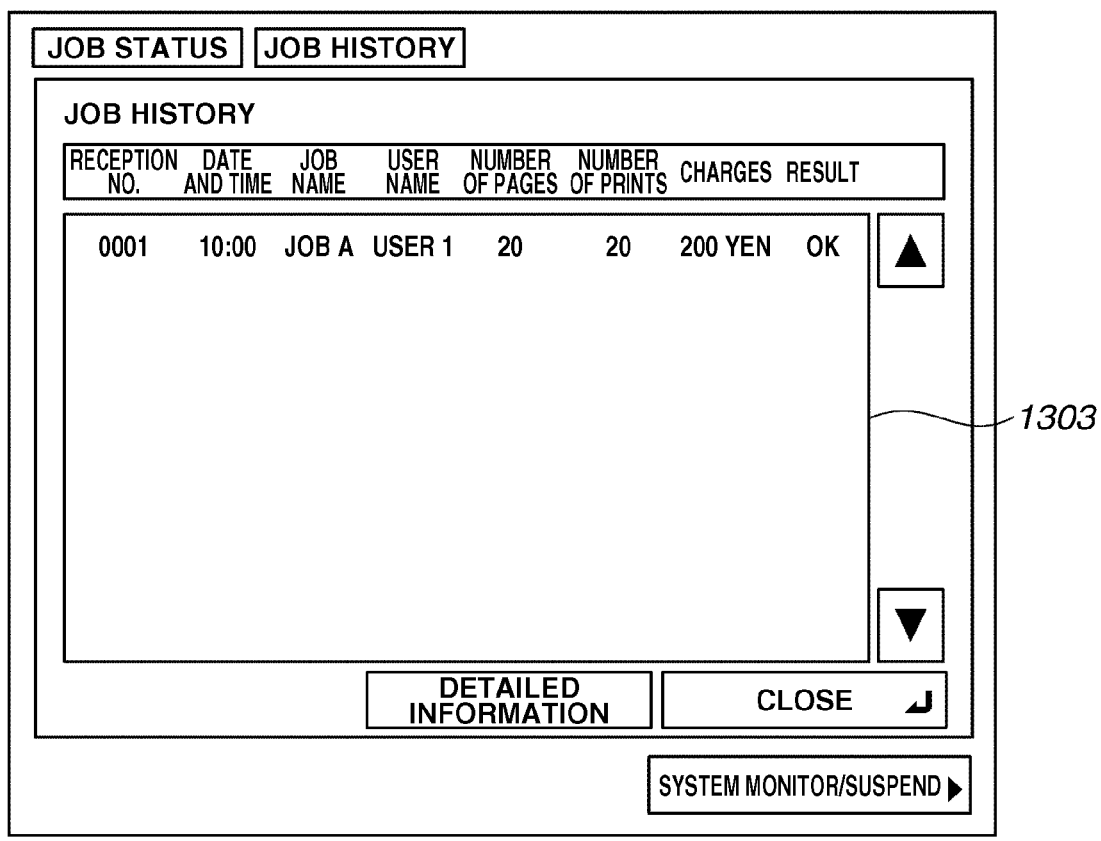
FIG. 13 is a view illustrating an example of a display screen displayed on an operation unit according to an exemplary embodiment of the present invention.

Next, in step S809, the control unit 301 determines whether print processing of the print job A is completed. If the print job A is not completed, the processing returns to step S808. If the print job A is completed, the control unit 301 advances the processing to step S810. In step S810, the control unit 301 determines a user who has lastly logged in to the image processing apparatus 101 by referring to the login user storage area 508. Then, the control unit 301 treats information about the executed print job A as information about a print job executed by a user (user 1) who lastly logged in to the image processing apparatus, and stores the information in history information storage area 509 of the HDD 309 in association with ID of the user ((user 1). For example, the control unit 301 stores the information about the executed print job as shown in FIG. 12. The information stored therein can be displayed later on the operation unit 307 based on a user instruction so that it can be recognized as history information about the print job executed by the user 1. For example, in the case where the system status key 1004 is pressed, a job status screen of FIG. 11 is displayed, and a job history key 1102 is pressed in the screen of FIG. 11, the control unit 301 displays a history information screen shown in FIG. 13, based on history information stored in history information storage area 509 of the HDD 309. On this history information display screen, a calculated amount of money to be billed to a user may be displayed at the time of executing a print job. In FIG. 13, the control unit 301 performs display in a job status display area 1303 so that a user can recognize that 20 pieces of paper are required and 200 yen is required for print processing as a result of executing the print job A requested by user 1.

In this way, the control unit 301 can carry out billing other than leaving history information relative to a user who has executed a print job.

A variety of billing methods can be considered. For example, there is a method in which a user stores an amount of money paid in advance in the HDD 309 of the image processing apparatus 101, and the control unit 301 subtracts an amount of money that is required for printing (200 yen in the case of the print job A) from the stored money.

There is another method in which the control unit 301 stores an amount of money that has been required for printing, and periodically presents the amount of money required for the printing in that month, for example, at the end of the month to the user, on a display screen of the client computer 106.

There is also a method in which the server computer 105 manages information about print processing every month in batch history concerning the image processing apparatuses 101 to 103 shown in FIG. 1, and adds up an amount of money that has been required for printing in that month on a user-by-user basis, at the end of the month.

Returning to the flow chart of FIG. 8, the control unit 301 carries out the processing of step S811 after the processing of step S810 is completed.

In step S811, the control unit 301 determines whether a logout key 1003 is pressed. If it is detected that the logout key is pressed, the control unit 301 terminates the processing. If the control unit 301 has terminated the processing, the screen of FIG. 9 is displayed on the operation unit 307 again.

In the case where the screen shown in FIG. 9 is displayed on the operation unit 307, and a predetermined period of time has elapsed in a state in which there is no user who has logged in, the display of the operation unit 307 is cleared so that a current mode can move to a power saving mode. Further, after the current mode is moved to the power saving mode, the processing in and after step S801 can be carried out when any key of the touch panel unit 401 or the key input unit 401 of the operation unit 307 is pressed so that a series of controls shown in the flow chart of FIG. 8 can be started.

Figure 14:
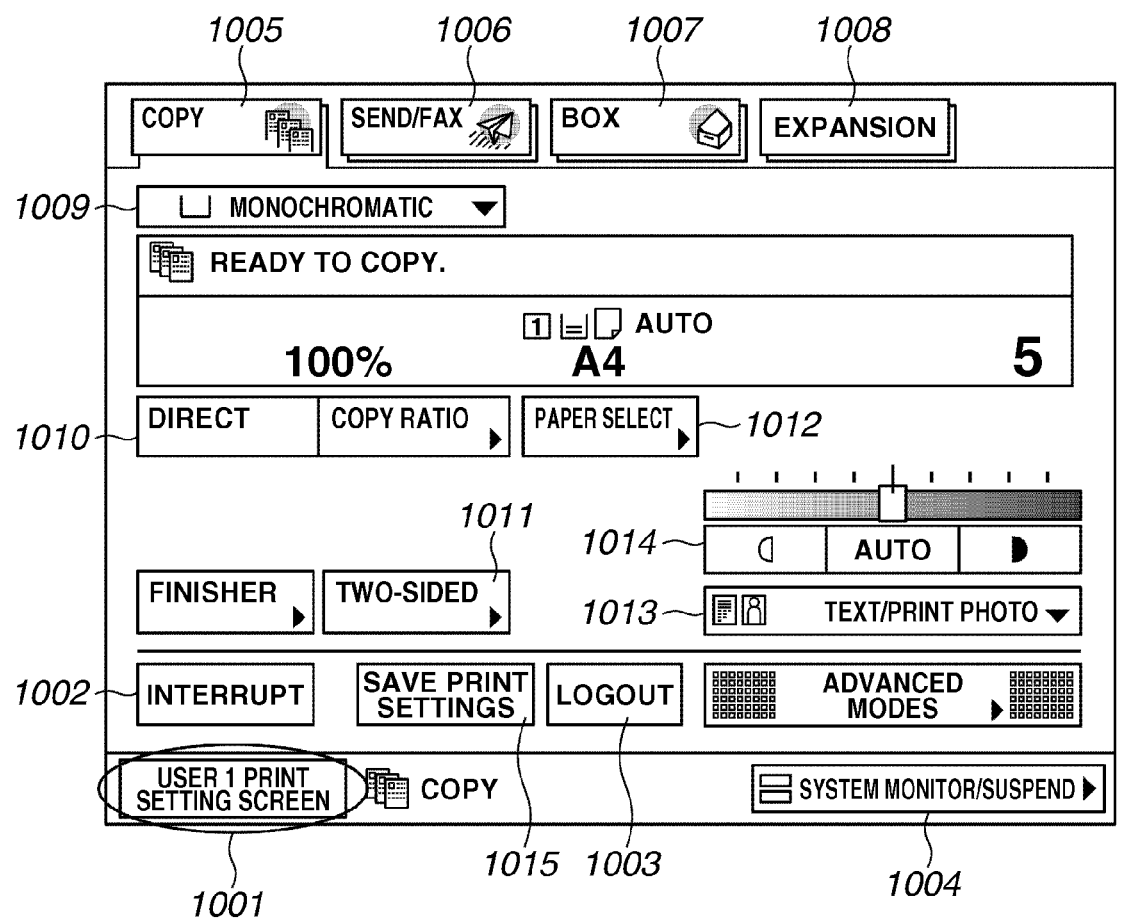
FIG. 14 is a view illustrating an example of a display screen displayed on an operation unit according to an exemplary embodiment of the present invention.

On the other hand, in step S811, if it is determined that the logout key 1003 has not been pressed, the control unit 301 advances the processing to step S805. For example, while the screen of FIG. 10 or FIG. 14 is displayed on the operation unit 307, namely, while the screen is displayed so that the logout key can be selected, even before print processing of a print job is completed, a user can log out by pressing the logout key. In that case, while the login screen shown in FIG. 9 is displayed on the operation unit 307, the control unit 301 carries out print processing of a print job that exists in a print queue so that processing similar to step S810 can be carried out after the completion of the print job.

For example, it is assumed that while a series of processing operations shown in step S801 to step S811 are carried out, the user 2 presses the ID key 410. In this case, the control unit 301 determines that a login request is issued in step S801, and displays the login screen shown in FIG. 9 on the operation unit 307 in step S802. At this time, the screen shown in FIG. 15 may be displayed on the operation unit 307 instead of the screen shown in FIG. 9. The control unit 301 performs display on the screen shown in FIG. 15 informing that the user 1 has already logged in and that a user other than the user 1 is going to log in via the screen. An example of the screen of FIG. 15 will be described below.

When the control unit 301 detects that an OK key 1504 of FIG. 15 is pressed via the touch panel of the operation unit 307, the control unit 301 carries out user authentication based on user ID and password input to a user ID field 1501 and a password field 1502 in step S803.

In step S804, the control unit 301 carries out next control when it is determined that the input ID and password are coincident with those registered in the HDD 309. The control unit 301 stores information indicating a user who has logged in to the image processing apparatus 101, for example, the input ID in the login user storage area 508 of the HDD 309. In addition, the control unit 301 stores also information indicating a user who has lastly logged in to the image processing apparatus 101 in the login user storage area 508 of the HDD 309. Then, the control unit 301 advances the processing to step S805. In the following description, a user who has logged in is referred to as a user 2.

In step S805, the control unit 301 determines whether there exists another user who has logged into the image processing apparatus 101 other than the user (user 2) authenticated in step S803. In this case, when authentication of the user 2 is carried out, the user 1 has already logged in to the image processing apparatus 101. Therefore, the control unit 301 determines that another user exists and advances the processing to step S812.

In step S812, the control unit 301 stores information about print setting received from the user 1 (information about print setting or print setting screen) in the print setting information save area 510.

Figure 16:
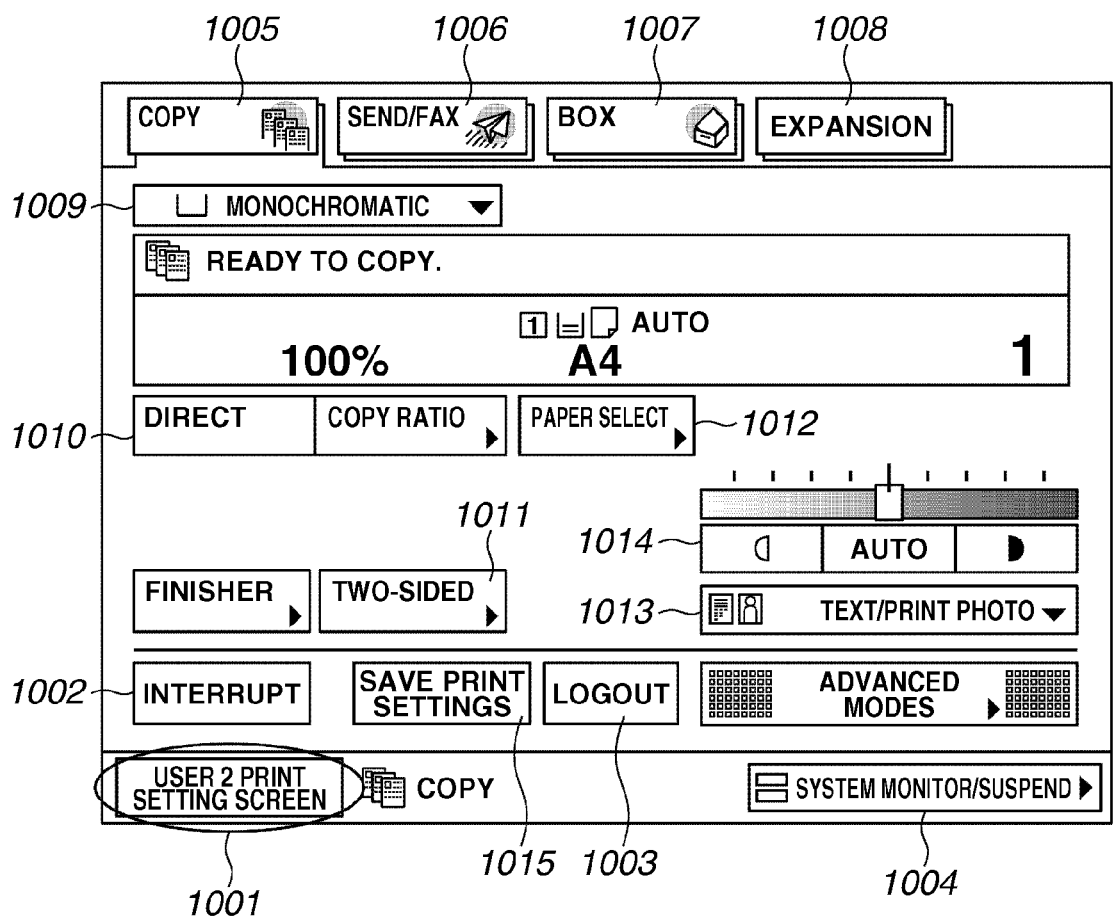
FIG. 16 is a view illustrating an example of a display screen displayed on an operation unit according to an exemplary embodiment of the present invention.
Figure 17:
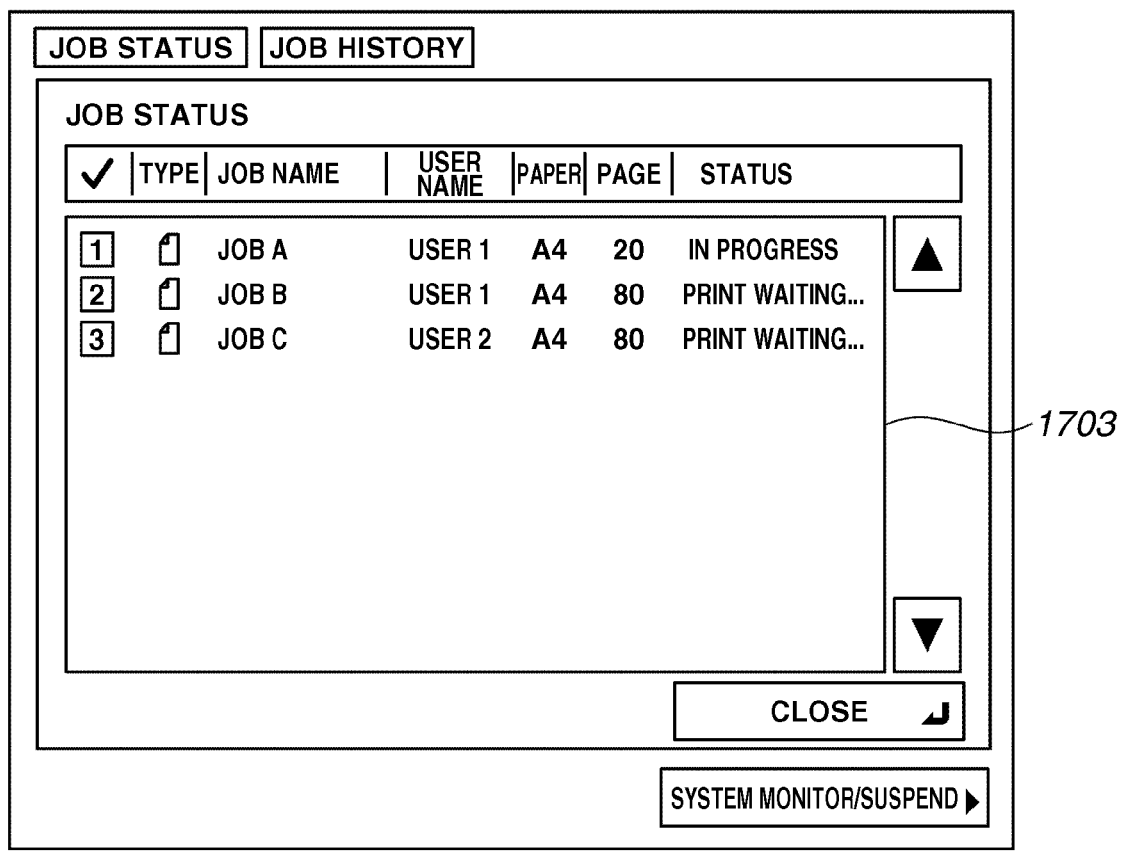
FIG. 17 is a view illustrating an example of a display screen displayed on an operation unit according to an exemplary embodiment of the present invention.

In step S813, the control unit 301 displays on the operation unit 307 a print setting screen for the user 2 shown in FIG. 16, namely, a display screen different from that for the user 1. At this time, the control unit 301 displays a display screen based on initial screen information 506 for the user 2 stored in the HDD 309. In FIG. 16, the control unit 301 displays a user who has lastly logged in the user display area 1001 so that a user can recognize for whom the print setting screen is displayed.

In step S814, it is determined whether a request for executing a print job has been accepted via the operation unit 307. In the case where a request for executing a print job has not been made, the processing of step S816 is repeated. The control unit 301 advances the processing to step S815 if it is determined that a request for executing a print job has been accepted.

In step S815, the control unit 301 executes a print job.

For example, it is assumed that the user 1 has made a request to execute the print job A and print job B, print job A is being executed, and print job B is in a waiting state. In that state, it is assumed that a request has been made to execute a print job C after the user 2 has logged in. In such a situation, if a system status key 1004 shown in FIG. 16 is pressed, the control unit 301 displays a job status screen shown in FIG. 17 on the operation unit 307. On the screen shown in FIG. 17, the control unit 301 displays information about a print job entered into the print queue 501. The control unit 301 performs display on a job status display area 1703 so that a user can recognize that the print job A requested by the user A is being executed and the print job B is in a waiting state. In addition, the control unit 301 performs display so that the user can recognize that the print job C requested by the user 2 is in a waiting state.

In step S816, the control unit 301 determines whether the print processing of print job C is completed. If the print processing is not completed, the control unit 301 returns the processing to step S815 and the print processing of print job C is continued. If the print processing is completed, the control unit 301 advances the processing to step S817.

In step S817, the control unit 301 stores information about the print job C that has been executed, as information about a print job executed by a user (user 2) who has later logged in to the image processing apparatus 101, in association with ID of the user (user 2) in the HDD 309. For example, the information is stored as shown in FIG. 18. The stored information can be displayed later according to the user's instruction on the operation unit 307 as shown in FIG. 19 as history information about a print job that has been executed. Here, the information about the print job C that the control unit 301 stores is not stored in association with ID of a login user (user 1), but is stored in association with ID of a user (user 2). Then, the control unit 301 advances the processing to step S818.

In step S818, the control unit 301 automatically releases a login state of a user (user 2). In step S819, the control unit 301 displays the screen for the user 1 based on information about print setting stored in the print setting information save area 510 in step S812. Then, the control unit 301 displays the print setting screen for the user 1 on the operation unit 307. After that, the control unit 301 advances the processing to step S811.

A flow of a series of controls in the present embodiment has been described above. In the configuration according to the present embodiment, history information can be correctly stored even when an image processing apparatus is configured to permit a plurality of users to be in a login state. In addition, print setting information about a user who has previously logged in to an image processing apparatus can be saved, and a print setting screen can be displayed later based on the print setting information of the user after logout of a user who logs in later. In this manner, it is possible to reduce a work load that occurs when the user who has previously logged in performs print setting again after logout of the user who has logged in later.

Second Exemplary Embodiment

Now, a second embodiment of the present invention will be described below.

In the second embodiment, while a print request A made by a user 1 is executed by the image processing apparatus 101, a user 2 causes the image processing apparatus 101 to carry out interrupt printing of print job B.

Figure 21:
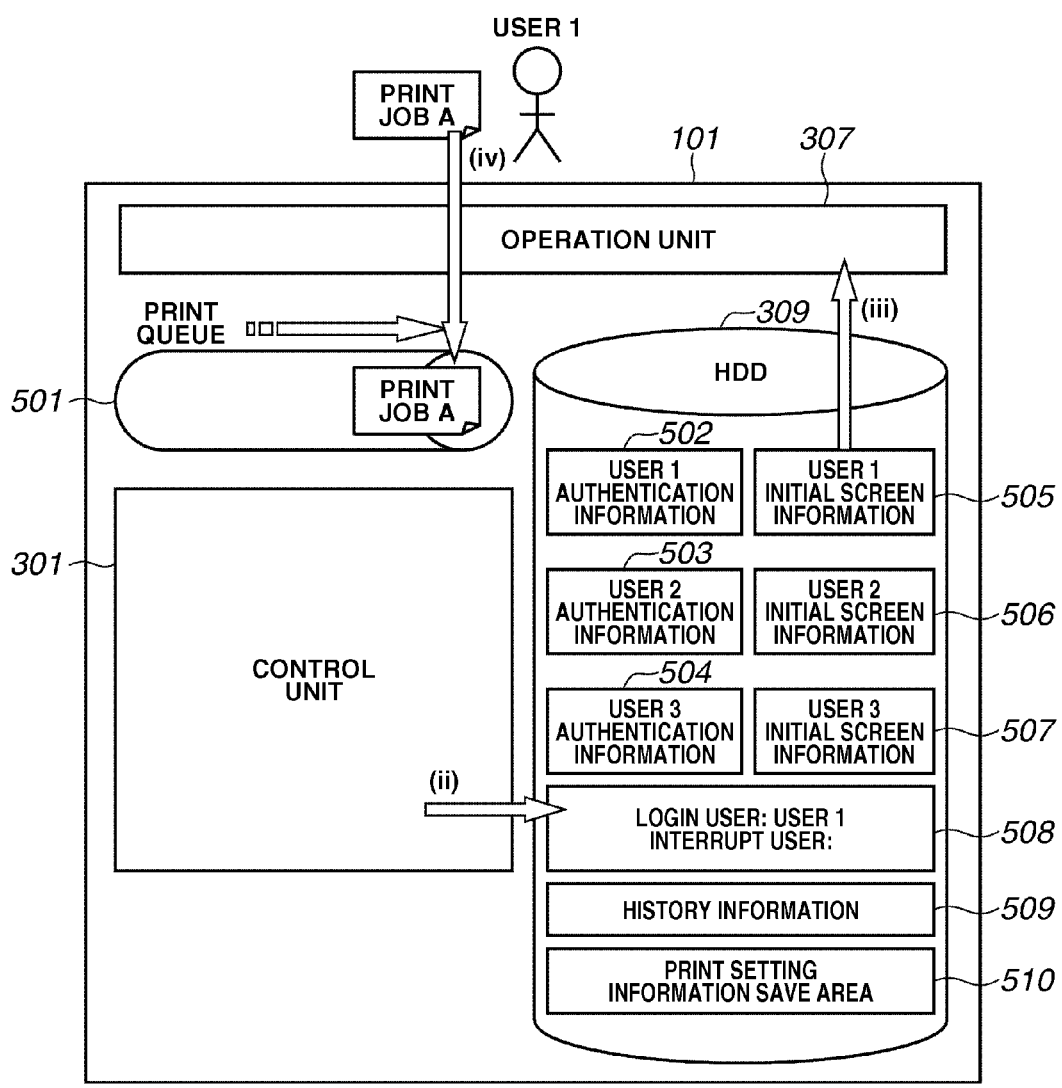
FIG. 21 is a schematic view illustrating an exemplary control of an image processing apparatus according to an embodiment of the present invention.
Figure 22:
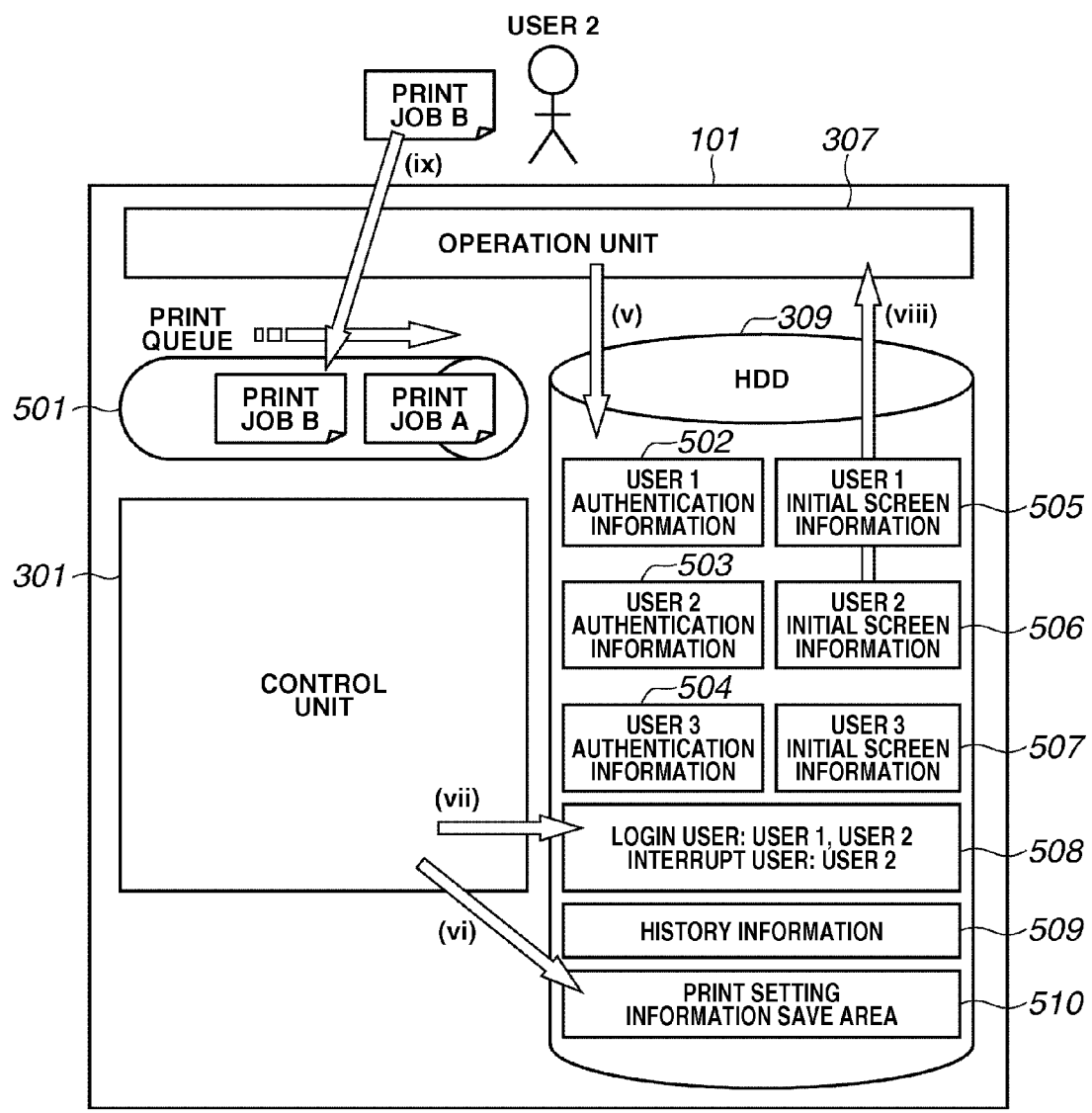
FIG. 22 is a schematic view illustrating an exemplary control of an image processing apparatus according to an exemplary embodiment of the present invention.

First, with reference to the schematic view shown in FIG. 20 to FIG. 22, a flow for executing print processing using the image processing apparatus 101 will be described.

In the second embodiment of the present invention, similar to the first embodiment, it is presumed that a user who utilizes the image forming apparatus 101 is required to log in to image forming apparatus 101.

Figure 20:
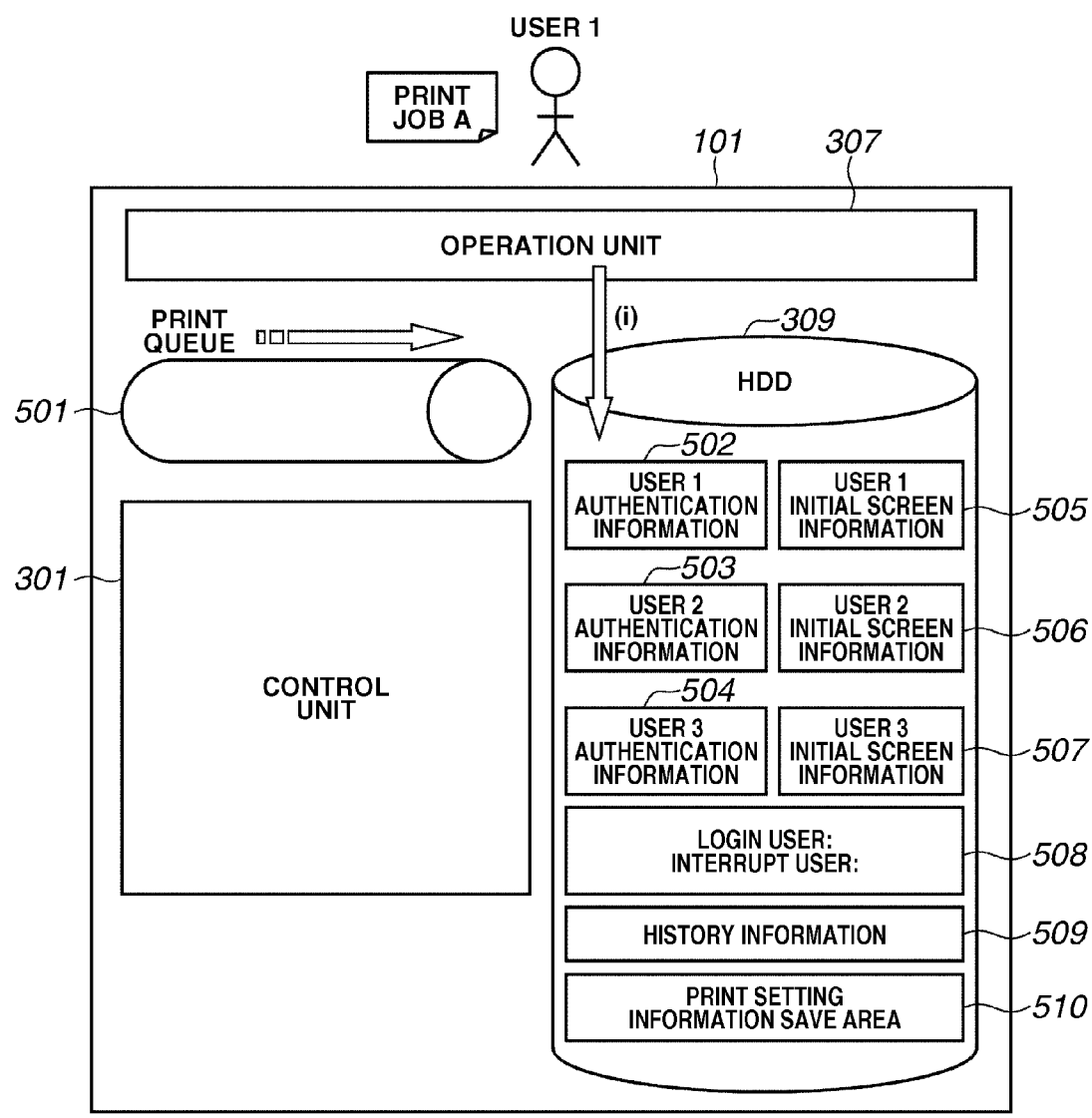
FIG. 20 is a schematic view illustrating an exemplary control of an image processing apparatus according to an embodiment of the present invention.

While FIG. 20 illustrates a configuration that is almost similar to that of FIG. 5, a part of information is different from the information stored in the login user storage area 508 of FIG. 5.

First, the control unit 301 receives user ID and password from the user 1, and carries out user authentication based on the received user ID and password.

Then, the control unit 301 stores, in a login user storage area 508 of the HDD 309, information indicating that a user who has logged in to the image processing apparatus 101 is the user 1 (ii). Further, when a print job is completed in this state, the control unit 301 stores, in the history information storage unit 509 of the HDD 309, history information about a print job that has been executed, as history information about the user 1.

The control unit 301 displays a print setting screen for the user 1 on the operation unit 307 based on the initial screen information 505 about the user 1 registered in the HDD 309 (iii).

When the print setting screen for the user 1 is displayed on the operation unit 307, the user 1 carries out print setting via the print setting screen, and makes a print request for a print job (hereinafter, referred to as print job A) under the print setting. In that case, the control unit 301 arranges the requested print job A at the head of the print queue 501 (iv).

If a print job being executed or in a waiting state does not exist in the print queue 501, the control unit 301 starts execution of the print job A. If a print job being executed or in a waiting state already exist in the print queue 501, the print job A is arranged in the print queue 501 such that the print job A is executed after the other print job is completed.

Then, in a state where a print setting screen for the user 1 is displayed, when the user 2 makes a request for printing a print job (hereinafter, referred to as print job B or interrupt printing job), the user 2 presses the interrupt key 1002 displayed on the touch panel unit 401 of the operation unit 307. When the interrupt key 1002 is pressed, the control unit 301 displays a login screen. The user 2 inputs user ID and password via the login screen. The image processing apparatus 101 temporarily stores the input user ID and password in the HDD 309 (v), compares the input user ID and password with the authentication information 502 to 504 registered in advance in the HDD 309, determines whether they are coincident, and permits login of the user 2 if they are coincident. When the login is successful, the user 2 can execute print processing using the image processing apparatus 101.

Then, the control unit 301 stores, in the login user storage area 508 of the HDD 309, information indicating that users who are logging in to the image processing apparatus 101 are the user 1 and user 2. In addition, a user who has logged in via a login screen which is displayed by pressing the interrupt key 1002 (an interrupting user), can be specified from user ID input via the login screen. Here, in a state where the user 1 has logged into the image processing apparatus 101, information indicating that a user who has logged in to the image processing apparatus later is the user 2 is stored in the login user storage area 508 of the HDD 309 (vi). When execution of a print job is completed in this state, history information about a print job that has been executed, is stored as history information about the user 2 in a history information storage unit of the HDD 309.

In addition, the control unit 301 displays a print setting screen for the user 2 on the operation unit 307 based on initial screen information about the user 2 registered in the HDD 309 (vii).

Then, the user 2 operates a print setting screen of the operation unit 307, and makes a request to print the print job B. In that case, the control unit 301 interrupts printing processing of the print job A being executed, arranges the print job B to which the print request has been made, at the head of print queue 1705 (viii), and starts execution of the print job B. Then, upon completion of the print job B, the history information about the print job B is stored in HDD 209 as execution history information for the user 2. Further, upon completion of the print job B, execution of the cancelled print job A is restarted. Then, when the print job A is completed, the control unit 301 stores print history information about the print job A as history information about the user 1 in HDD 209.

The above described history information is stored in history information storage area 509 of the HDD 309. The control unit 301 stores history information on a user-by-user basis in a format as shown in FIG. 29 which will be described below.

Thus, when a certain user is logging in to an image processing apparatus, even if another user carries out print interrupt processing using the image processing apparatus, print history information can be correctly stored on a user-by-user basis by performing the control as described above.

Now, the present embodiment of this image processing apparatus described with reference to the schematic view of FIG. 20 to FIG. 22 will be described in detail using the flow chart shown in FIG. 23 and the display screen displayed on the operation unit 307 as an example.

Figure 23:
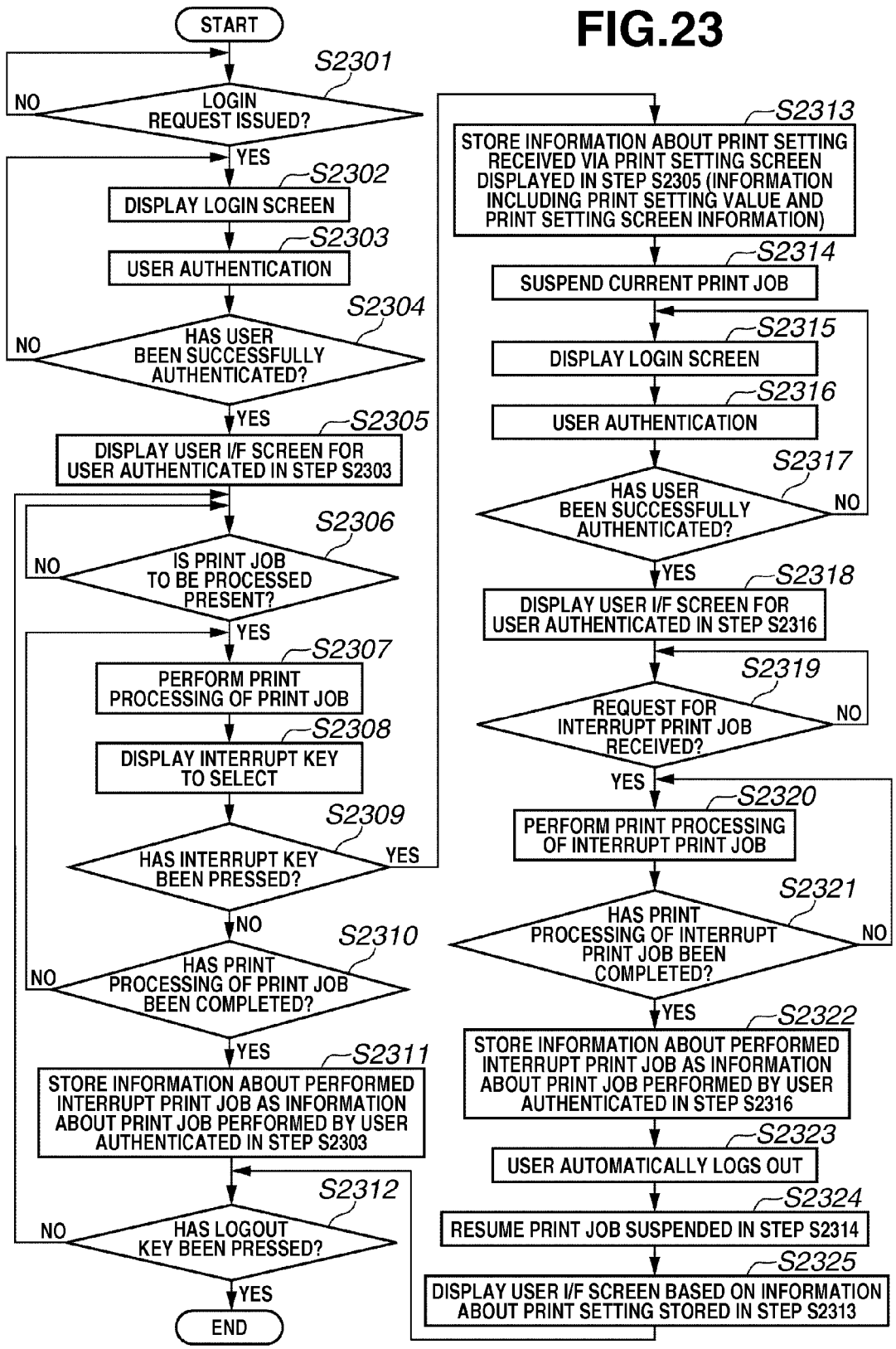
FIG. 23 is a flow chart illustrating an example of data processing procedures according to an exemplary embodiment of the present invention.

FIG. 23 is a flow chart illustrating a control example in the embodiment of the present invention.

In step S2301, when the control unit 301 detects that IID key 401 is pressed, the control unit 301 displays a login screen as shown in FIG. 9 on the operation unit 307 in step S2302.

In step S2303, when the control unit 301 detects that OK key 905 of FIG. 9 is pressed via the operation unit 307, the control unit 301 carries out user authentication based on user ID and password input into the user ID field 901 and the password field 902.

Then, in step S2304, when the control unit 301 determines that the input ID and password are coincident with those registered in the HDD 309, the control unit 301 advances the processing to step S804. In step S2304, if the control unit 301 determines that the input ID and password do not match with those registered in the HDD 309, the control unit 301 returns the processing to step S2302.

Figure 24:
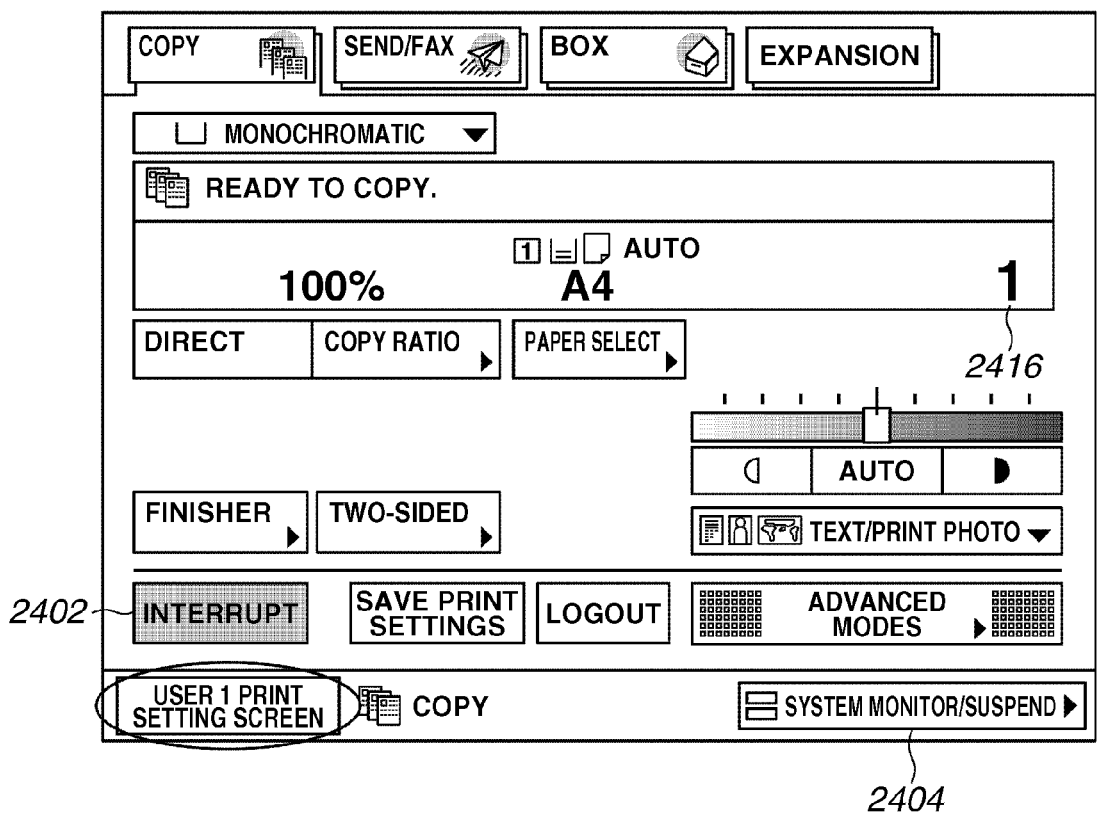
FIG. 24 is a view describing an example of a display screen displayed at an operation unit according to an exemplary embodiment of the present invention.

In step S2305, the control unit 301 displays, on the operation unit 307, a screen for the user authenticated in step S802 as shown in FIG. 24, based on information of initial screen for the user stored in the HDD 309 in association with the user ID. In the following description, a user who has logged in through the processing of step S802 to step S804 is assumed to be the user 1 as described previously with reference to the schematic view.

The print setting screen is almost similar to that for the user 1 shown in FIG. 10. However, while the control unit 301 displays the interrupt key 1002 which is selectable on the print setting screen of FIG. 10, the interrupt key 1002 on the print setting screen shown in FIG. 24 is not selectable.

In step S2306, the control unit 301 determines whether a print job requested via the print setting screen as described above or a print job transmitted from the client computer 106 exists in the HDD 309. In the case where the print job does not exist, the control unit 301 repeats processing of step S2306. In the case where the print job exists, the control unit 301 advances the processing to step S2307 and executes the print job. Here, the print job requested by user 1 is referred to as a print job A.

When the print job A is executed, if a system status key 2404 shown in FIG. 24 is pressed, the control unit 301 displays a job status screen as shown in FIG. 11 on the operation unit 307.

Figure 25:
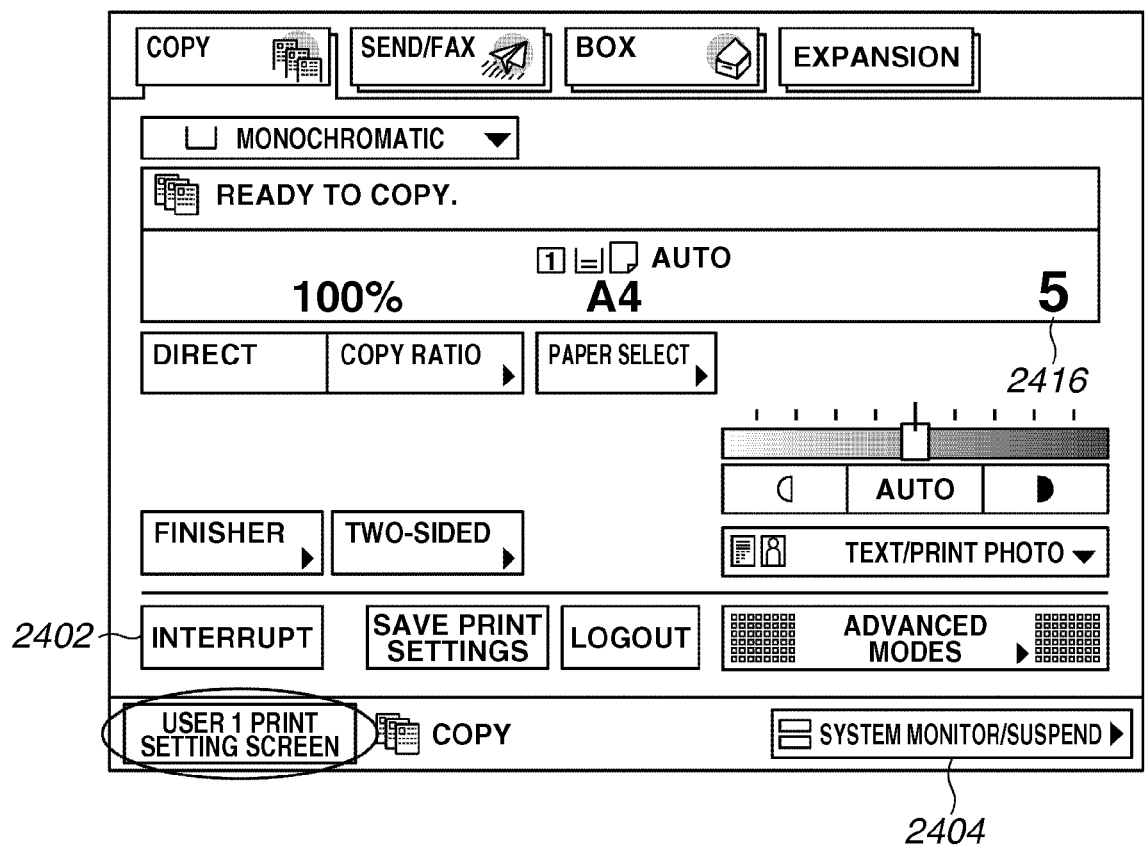
FIG. 25 is a view illustrating an example of a display screen displayed on an operation unit according to an exemplary embodiment of the present invention.

Next, in step S2308, the control unit 301 displays the interrupt key 1002 which is selectable, on the display screen of the operation unit 307 of FIG. 24. For example, the control unit 301 displays the screen shown in FIG. 25 on the operation unit 307. In FIG. 25, a user sets five copies for print, and the control unit 301 displays the number of copies in a print copy number display area 2416.

In step S2309, the control unit 301 determines whether an interrupt key 2402 is pressed. If the interrupt key 2402 is not pressed, the control unit 301 determines whether processing of the print job A is completed in step S2310. If it is determined that the print job A is not completed, the control unit 301 advances the processing to step S2307, and continues the print processing of the print job A.

If it is determined that the print job A is completed in step S2319, the control unit 301 advances the processing to step S2311. In step S2311, the control unit 301 treats information about the executed print job A as information about a print job executed by the user 1 and stores the information in history information storage area 509 of the HDD 309 in association with ID of the user 1, for example, as shown in FIG. 12. The stored information can be displayed later on the operation unit 307 according to a user instruction, as history information about a print job executed by the user 1. For example, after the system status key 1004 is pressed, and the job status screen of FIG. 11 is displayed, if the job history key 1102 is pressed in the screen of FIG. 11, the control unit 301 displays the history information screen shown in FIG. 13 based on the history information stored in history information storage area 509 of HDD 309. An amount of money to be billed to a user for the execution of the print job can be displayed on the history information display screen.

Next, in step S2312 the control unit 301 determines whether the logout key 1003 is pressed and terminates the processing if it is detected that the logout key is pressed. In the case where the processing has been terminated, the screen of FIG. 9 is displayed again on the operation unit 307.

On the other hand, in step S2312, the control unit 301 advances the processing to step S2306 in the case where it is determined that the logout key 1003 is not pressed. Further, while the screen of FIG. 10 or FIG. 14 is displayed on the operation unit 307, namely, while the screen is displayed such that the logout key can be selected, even before print processing of a print job is completed, a user can logs out by pressing the logout key. In this case, while the control unit 301 displays the login screen shown in FIG. 9 on the operation unit 307, the control unit 301 carries on the print processing of a print job that exists in a print queue, and the processing similar to that carried out in step S2311 can be performed after the completion of the print job.

On the other hand, in step S2309, the control unit 301 advances the processing to step S2313 in the case where it is determined that the interrupt print key 1402 is pressed. In step S2313, the control unit 301 stores, in the print setting information save area 510, information about print setting accepted via the print setting screen displayed in step S2305. For example, when print of five copies is set on the display screen of FIG. 25, if the interrupt key is pressed, the control unit 301 stores, in the print setting information saving area 510, the print setting information as to the print of five copies, in step S2313. Then, the control unit 301 advances the processing to step S2314.

In step S2314, the control unit 301 temporarily stops print processing of the print job A.

Then, in step S2315, the control unit 301 displays a login screen for another user other than a user authenticated in step S802 (hereinafter, also referred to as interrupt user). When the control unit 301 detects that an OK key 2605 is pressed in the screen shown in FIG. 26, the control unit 301 carries out user authentication in step S2316 based on ID input into a user ID field 2601 and the password input into a password field 2602.

Figure 26:
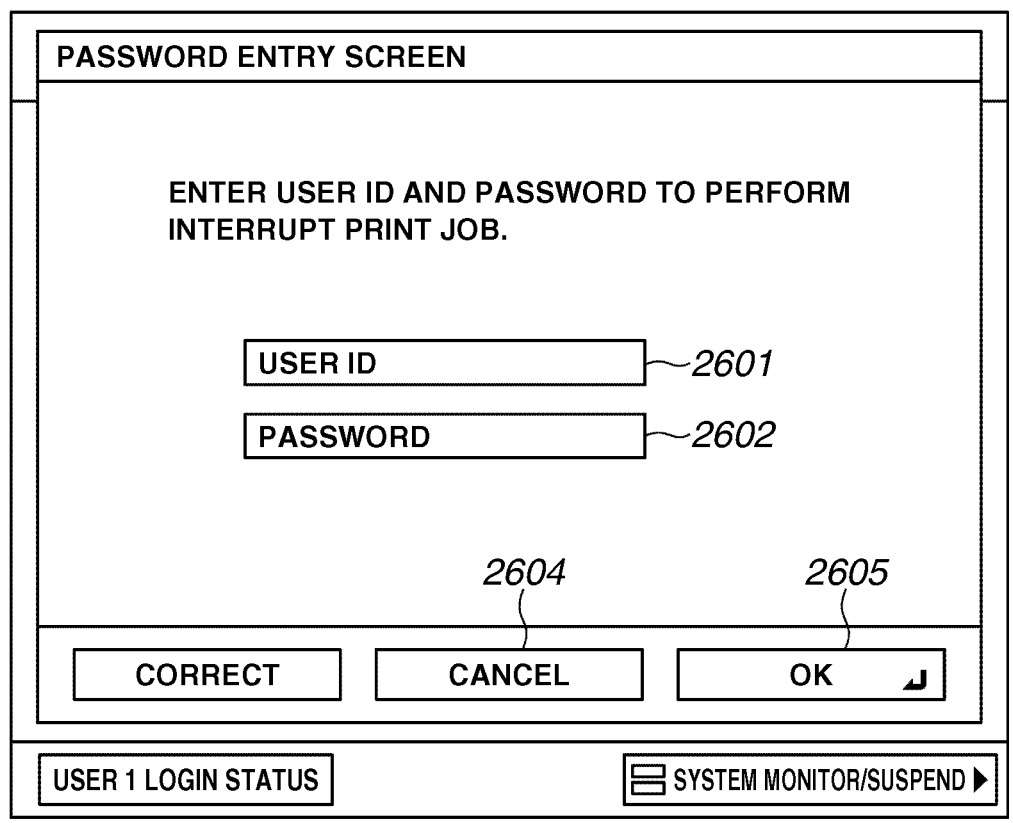
FIG. 26 is a view illustrating an example of a display screen displayed on an operation unit according to an exemplary embodiment of the present invention.

When the control unit 301 detects that a cancel key 2604 of FIG. 26 is pressed, the control unit 301 displays the screen shown in FIG. 25 on the operation unit 307.

In step S2316, the control unit 301 determines whether the input user ID and password are coincident with those registered in the HDD 309. If it is determined that the input user ID and password are coincident with those registered in the HDD 309 in step S2317, the control unit 301 advances the processing to step S2318. In this case, the control unit 301 inputs the user ID and password onto the login screen of FIG. 26, and stores information about a user who has logged in (for example, input ID) in the login user storage area 509 of the HDD 309 to specify a user who is logging in. Here, it is assumed that a user 2 has logged in as an interrupt user. On the other hand, if it is determined that the input user ID and password are not coincident with those registered in the HDD 309 in step S2317, the control unit 301 returns the processing to step S2315.

Figure 27:
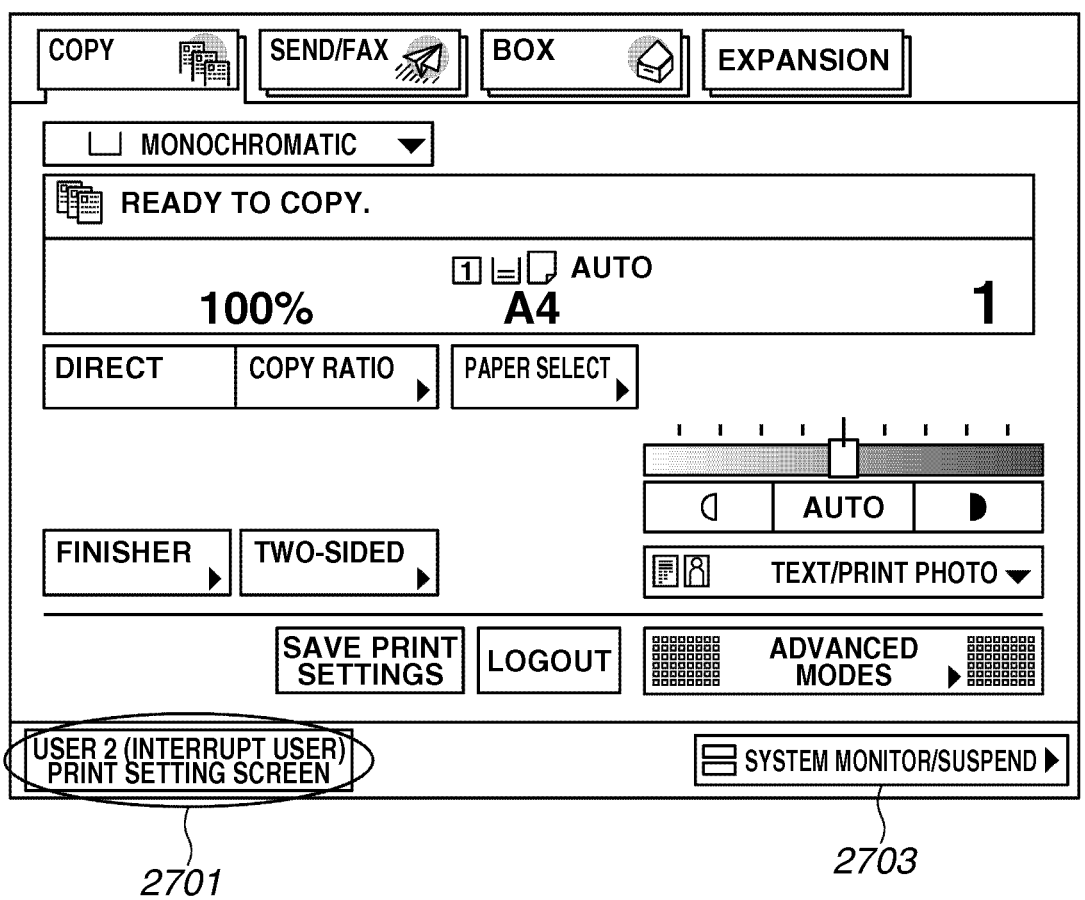
FIG. 27 is a view illustrating an example of a display screen displayed on an operation unit according to an exemplary embodiment of the present invention.

In step S2318, the control unit 301 displays a print setting screen for an interrupt user (user 2) shown in FIG. 27. More specifically, the control unit 301 displays, on the operation unit 307, the display screen for a user authenticated in step S2316, which is different from the screen for a user (user 1) authenticated in step S2303. In this case, the control unit 301 displays a print setting screen based on initial screen information 506 of the user 2 stored in HDD 209. In FIG. 27, the control unit 301 displays an interrupt user who has logged in by pressing the interrupt key 2402, in an interrupt user display area 2701, to enable the user to recognize who is attempting to execute interrupt printing.

In step S2319, it is determined whether a request for interrupting the printing job has been accepted via the operation unit 307. If the request for interrupting the printing job has not been accepted, the processing of step S2319 is repeated. If it is determined that the request has been accepted, the operation unit 307 advances the processing to step S2320.

In step S2320, the control unit 301 executes an interrupt print job.

For example, it is assumed that, after the user 1 has made a request to execute a print job A, the user 1 also makes a request to execute a print job B while the print job A is being executed, and the print job B is in a waiting state. In that state, it is assumed that a user 2 presses the interrupt key 2402 to log in, and the user 2 has made a request to execute an interrupt print job C. In that case, the control unit 301 stops the print job A being executed, and starts the interrupt print job C. Under that situation, if a system status key 2703 shown in FIG. 27 is pressed, the control unit 301 displays a job status screen shown in FIG. 28 on the operation unit 307. On the screen shown in FIG. 28, the control unit 301 displays information about a print job entered in the print queue 501. The control unit 301 performs display on a job status display area 2803 of FIG. 28, to enable the user to recognize that the print job A and print job B which the user 1 has requested to print are in a waiting state and that the interrupt print job C which the user 2 has requested to print is being executed. Then, the control unit 301 advances the processing to step S2321.

In step S2321, the control unit 301 determines whether print processing of the interrupt print job C is completed. If the print processing of the interrupt print job C is not completed, the control unit 301 returns the processing to step S2320, and continues print processing of the interrupt print job C. If the print processing of the interrupt print job C is completed, the control unit 301 advances the processing to step S2322.

In step S2322, the control unit 301 treats information about the interrupt print job C that has been executed, as information about a print job executed by an interrupt user (user 2), and stores the information in association with ID of the interrupt user (user 2) in the HDD 309. For example, the information is stored as shown in FIG. 29. The information stored in the HDD 309 can be displayed later on the operation unit 307 as shown in FIG. 30 as history information about a print job executed by a user instruction. In this case, because the information to be stored is information about the interrupt print job C, the information is not stored in association with ID of a login user (user 1), but in association with ID of an interrupt user (user 2). In addition, information that the print job C is an interrupt printed job is stored. Then, the control unit 301 advances the processing to step S2323.

In step S2323, the control unit 301 automatically releases an interrupt user login state. Then, in step S2324, the control unit 301 restarts print processing of the print job that has been stopped in step S2314, and advances the processing to step S2325. In step S2325, the control unit 301 displays, on the operation unit 307, a user screen for the user authenticated in step S2303. Print setting information stored in the print setting information save area 510 is reflected on the user screen. Then, the control unit 301 advances the processing to step S2312.

The second embodiment described above shows an example of canceling proceeding of a print job being executed when an interrupt user has pressed the interrupt key 1402. In this manner, the interrupt user can cancel a print job being printed with timing that the user originally desires, and execute an interrupt print job. However, the present embodiment is not limited thereto. The control unit 301 may cancel execution of a print job being executed after a request for executing an interrupt print job has been accepted, namely, after a request for executing the interrupt print job has been accepted in the processing of step 2318. In this manner, print processing of a print job can be executed until execution of an interrupt print job is started after interrupt key 1402 is pressed, so that reduction of productivity caused by the interrupt printing can be minimized.

In addition, the interrupt processing executed by the user 2 can be a function that does not requires print processing such as data transmission or storing the image data of an original read by the scanner unit 304 in a box. In such a case, interruption can be carried out without canceling print processing of the print job A, so that reduction of productivity can be effectively prevented.

Figure 31:
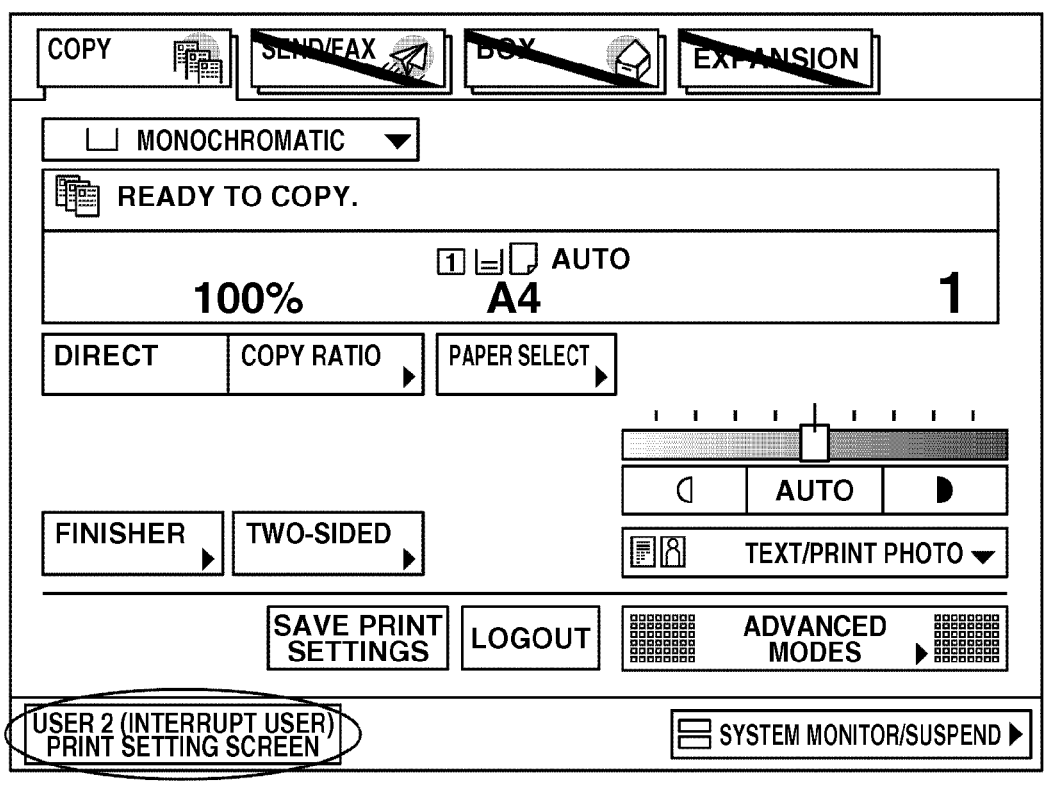
FIG. 31 is a view illustrating an example of a display screen displayed on an operation unit according to an exemplary embodiment of the present invention.

Further, in step S2317 of FIG. 23, the screen shown in FIG. 16 was described as an example of a screen to be displayed. However, the control unit 301 can also carry out following control in step S2317. In the case where login has been carried out via the screen shown in FIG. 25 that is displayed in step S2314, the control unit 301 compares such login with normal login carried out via the screen shown in FIG. 9, and displays the screen as shown in FIG. 31 on the operation unit 307 limiting a number of applicable functions or settable (applicable) items.

For example, if there does not exist another user who is logging in to the image processing apparatus 101 when the user 2 logs in, the initial screen shown in FIG. 27 is displayed as a print setting screen. In the case where login of the user 2 is carried out after an interrupt key 1402 is pressed, the screen as shown in FIG. 31 is displayed. In this manner, compared with a print setting screen displayed in normal printing carried out by a user, a number of functions applicable to the same user when interrupt printing is carried out, can be limited.

When interrupt printing is carried out, the number of copies can be limited. For example, in the case where the user 2 logs in not as an interrupt but as a general user via the login screen of FIG. 9, no limitation is applied to the number of copies to the user 2. However, in the case where the user 2 presses the interrupt key in a state in which the user 1 is logging in, and logs in via the login screen of FIG. 26, limitation is applied to disable printing exceeding 10 copies to the user 2. In this manner, the restart of the print job A that has been temporarily stopped by an interrupt print job, is not extremely delayed. Similarly, when the print processing is interrupted by a scanning operation, the number of copies that is readable via the scanner unit 304 can be limited. Also in this manner, a favorable effect is obtained that the restart of the temporarily stopped print job A is not extremely delayed.

In addition, an amount of billing as to a print job that interrupts processing to perform printing can be increased, for example, by 20 yen or twice as much per copy in comparison with an ordinary print job.

In addition, the history information that the control unit 301 described in the first embodiment or the second embodiment stores in history information storage area 509, can be employed in a variety of events other than displaying history information on the operation unit 307 or carrying out billing processing on a user-by-user basis. For example, the control unit 301 can limit use of the image processing apparatus 101 on a user-by-user basis, based on the history information. For example, the user 1 can be permitted to print a maximum of 100 copies, and the user 2 can be permitted to print a maximum of 50 copies. When the control unit 301 executes print processing of a print job accepted via a print setting screen of user 1 and the number of printed copies exceeds 100 copies, the control unit 301 prohibits processing of that print job. The control unit 301 can be configured to prohibit the user 2 from performing print processing of the print job if the number of printed copies exceeds 50 copies.

In addition, while the present embodiment has described an example of the control unit 301 which displays a variety of display screens on the operation unit 307, the operation unit 307 can be provided with its own controller, and the control unit 301 can feed an instruction to that controller so that the controller displays the instruction on the operation unit 307. In that case, the control unit 301 issues an instruction to cause the operation unit 307 to display a display screen.

While the first embodiment and the second embodiment as described above leave history information of a print job, the present invention is not limited thereto. Also in the case of leaving history information about a data transmission job or a job utilizing a box function (hereinafter, referred to as box job), control substantially similar to that described in the first embodiment and the second embodiment can be carried out. In this manner, for example, history information about a data transmission job of each user can also be correctly displayed later on the operation unit 307. In addition, history information about a box job (such as information indicating by whom, when, and how many pages of image data have been stored in box) can also be correctly displayed later on the operation unit 307. Further, by carrying out control substantially similar to that described in the first embodiment and the second embodiment, the control unit 301 can correctly carry out billing for each user who executes a transmission job or a box job.

The job processing system (for example, printing system) according to the embodiments described above is a system including a job processing device (image processing apparatus) and another device (client computer and/or server computer). However, the job processing system (for example, printing system) may can be a stand-alone job processing device (the image processing apparatus 101).

For example, the embodiments described above, as an example, stores history information of each user in the HDD 309 of the image processing apparatus 101. However, history information can be stored in the server computer 105 or the client computer 106.

In addition, a configuration of a data processing program will be described below that is readable by an image processing apparatus according to the present invention with reference to a memory map shown in FIG. 32.

Figure 32:
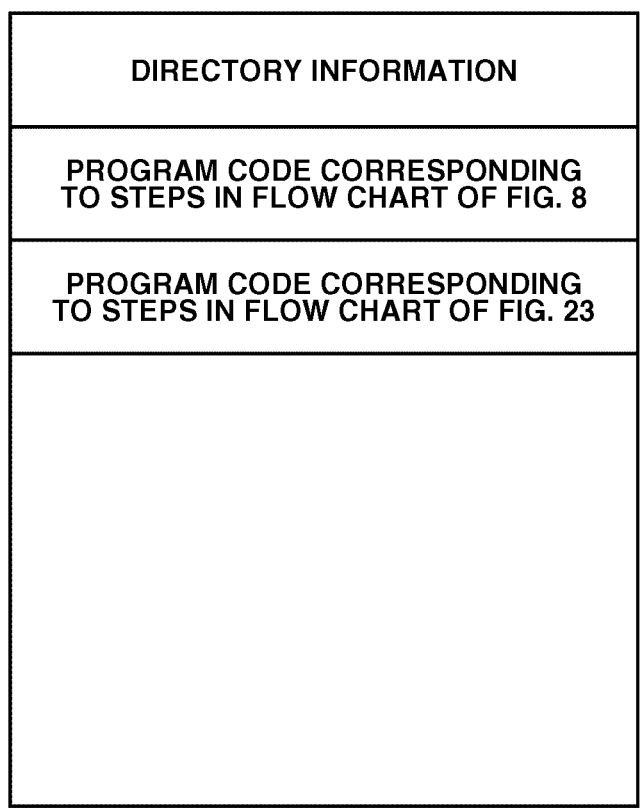
FIG. 32 is a view illustrating a program code according to an exemplary embodiment of the present invention.

FIG. 32 is a view illustrating a memory map of a storage medium storing a variety of data processing program that is readable by an image processing apparatus according to the present invention.

Although not shown in particular, information for managing programs stored in a storage medium such as version information and creator can be stored. Further, information depending on an OS or the like on the program readout side, for example, icons for identifying and displaying programs can also be stored.

Furthermore, data belonging to a variety of programs can be also managed in the directory as described above. Moreover, a program for installing a variety of programs in a computer or a program for decompressing the programs to be installed can also be stored.

The functions shown in FIG. 5 in the present embodiment can be carried out by a host computer in accordance with a program to be externally installed. In that case, the present invention can be applied even in the case where various information containing programs are supplied from an external storage medium to an output device via a network.

As described above, a storage medium having recorded program codes of software achieving functions of the above described embodiments is supplied to a system or equipment. The exemplary embodiments of the present invention are directed to a computer (or CPU and MPU) of the system or equipment reading out and executing program codes stored in a storage medium.

In this case, the program codes itself read out from a storage medium achieves novel functions of the present invention, and the storage medium storing the program codes constitutes the present invention.

Therefore, any program modes such as object codes, programs executable by interpreter, and script data supplied to an OS are also means for realizing the present invention as long as they have program functions.

A recording medium supplying the program can be selected from any one of a Floppy® disk, a hard disk, an optical disk, a magneto-optical disk, an MO, a CD-ROM, a CD-R, a CD-RW, a magnetic tape, a nonvolatile memory card, a ROM, and a DVD.

In this case, program codes itself read out from a storage medium achieve functions of the above described embodiments, and the storage mediums storing the program codes constitutes the present invention.

A program supplying method is described below. For example, programs can be supplied by making connection to home page of the Internet using browser of the client computers 106 and 107, and downloading computer programs per se of the present invention from the home page to a recording medium such as a hard disk. Alternatively, programs can also be supplied by downloading a file that is compressed and that contains an automatic installation function, to a recording medium such as a hard disk. In addition, programming can also be achieved by dividing program codes constituting programs of the present invention into a plurality of files, and downloading the respective files from different home pages. Namely, the present invention also contains a WWW server and an ftp server that enables a plurality of users to download program files for achieving functional processing of the present invention by a computer.

Further, the programs of the present invention can be delivered to a user by encoding them, and storing them in a storage medium such as a CD-ROM. Then, the authorized users (i.e., users satisfying predetermined conditions) are allowed to download key information from a home page on the internet. The users can decipher the programs using the key information and can install the programs on their computers. When the computer reads and executes the installed programs, the functions of the above-described embodiments can be realized.

In addition, the present invention is not limited to a case in which the functions of the above described embodiments are achieved by executing program codes that a computer has read out. For example, based on an instruction of the program, the operating system (OS) running on the computer may execute part or all of the processing so that the functions of the above-described embodiments can be realized.

Furthermore, the program read out of a recording medium can be written into a memory of a feature expansion board equipped in a computer or into a memory of a feature expansion unit connected to the computer. In this case, based on an instruction of the program, the CPU provided on the feature expansion board or the feature expansion unit can execute part or all of the processing so that the functions of the above-described embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-026678 filed Feb. 6, 2007, which is hereby incorporated by reference herein in its entirety.

What is claimed is:

1. A job processing apparatus having a plurality of functions, comprising:
    a memory; and
    a processor in communication with the memory, the processor configured:
    to permit, in a state in which a first user has logged in to the job processing apparatus or in a state in which the first user has not logged in to the job processing apparatus, a second user to log in to the job processing apparatus; and
    to permit the second user to use the plurality of functions in a case where the second user logs in to the job processing apparatus in the state in which the first user has not logged in to the job processing apparatus, and to restrict the second user from using a part of the plurality of functions in a case where the second user logs in to the job processing apparatus in the state in which the first user has logged in to the job processing apparatus.

2. The job processing apparatus according to claim 1, wherein the processor is further configured:
    to cause a display unit to display a first operating screen indicating that the second user can use the plurality of functions in a case where the second user logs in to the job processing apparatus in the state in which the first user has not logged in to the job processing apparatus, and to cause the display unit to display a second operating screen indicating that the second user is restricted from using the part of the plurality of functions in the case where the second user logs in to the job processing apparatus in the state in which the first user has logged in to the job processing apparatus.

3. The job processing apparatus according to claim 2, wherein the processor causes the display unit to display the first operating screen so that it can be recognized that the first operating screen is for receiving an operation from the first user, and to cause the display unit to display a second operating screen so that it can be recognized that the second operating screen is for receiving an operation from the second user.

4. The job processing apparatus according to claim 1, wherein the processor automatically carries out logging-out of the second user if the second user issues an instruction to the job processing unit to execute a job after the second user logs in to the job processing apparatus in the state in which the first user has logged in to the job processing apparatus.

5. The job processing apparatus according to claim 1, wherein the processor is further configured:
    to store information about a job as information about the second user in a storage unit, in the case where the second user logs in to the job processing apparatus in the state in which the first user has logged in to the job processing apparatus, and the second user issues an instruction to the job processing unit to execute the job using an operation unit of the job processing apparatus.

6. The job processing apparatus according to claim 5, wherein the processor specifies a user who makes a request for executing an interrupt job and causes the storage unit to store information about the interrupt job as information about the specified user in the case where executing of the interrupt job by the job processing unit is requested by the operation unit when a job requested by the first user is being executed by the job processing unit.

7. The job processing apparatus according to claim 6, wherein the processor performs control so that a login operation is executed in the case where a request for executing the interrupt job is made.

8. The job processing apparatus according to claim 1, wherein the plurality of functions include at least one of a copy function, a facsimile function, and a data storage function.

9. A method for controlling a job processing apparatus having a plurality of functions, the method comprising:
    permitting, in a state in which a first user has logged in to the job processing apparatus or in a state in which the first user has not logged in to the job processing apparatus, a second user to log in to the job processing apparatus;
    permitting the second user to use the plurality of functions in a case where the second user logs in to the job processing apparatus in the state in which the first user has not logged in to the job processing apparatus; and
    restricting the second user from using a part of the plurality of functions in a case where the second user logs in to the job processing apparatus in the state in which the first user has logged in to the job processing apparatus.

10. The method according to claim 9, further comprising: causing a display unit to display a first operating screen indicating that the second user can use the plurality of functions in a case where the second user logs in to the job processing apparatus in the state in which the first user has not logged in to the job processing apparatus, and to cause the display unit to display a second operating screen indicating that the second user is restricted from using the part of the plurality of functions in the case where the second user logs in to the job processing apparatus in the state in which the first user has logged in to the job processing apparatus.

11. The method according to claim 10, further comprising:
causing the display unit to display the first operating screen so that it can be recognized that the first operating screen is for receiving an operation from the first user, and to cause the display unit to display a second operating screen so that it can be recognized that the second operating screen is for receiving an operation from the second user.

12. The method according to claim 9, further comprising: automatically carrying out logging-out of the second user if the second user issues an instruction to the job processing unit to execute a job after the second user logs in to the job processing apparatus in the state in which the first user has logged in to the job processing apparatus.

13. The method according to claim 9, further comprising
storing information about a job as information about the second user in a storage unit, in the case where the second user logs in to the job processing apparatus in the state in which the first user has logged in to the job processing apparatus, and the second user issues an instruction to the job processing unit to execute the job using an operation unit of the job processing apparatus.

14. The method according to claim 9, further comprising:
specifying a user who makes a request for executing an interrupt job; and
causing the storage unit to store information about the interrupt job as information about the specified user in the case where executing of the interrupt job by the job processing unit is requested by the operation unit when a job requested by the first user is being executed by the job processing unit.

15. The method according to claim 14, further comprising performing control so that a login operation is executed in the case where a request for executing the interrupt job is made.

16. A computer-readable storage medium storing instructions which, when executed by a job processing apparatus, causes the job processing apparatus to execute the method according to claim 9.

17. An image forming apparatus comprising:
an operation unit;
a printer unit configured to execute printing according to a job setting;
a login control unit configured to permit, in a state in which a first user is currently logged in to the image forming apparatus or the first user has not logged in to the job processing apparatus, a second user to log in to the image forming apparatus; and
a control unit configured to restrict the number of copies available by the second user in a case where the second user logs in to the job processing apparatus in the state in which the first user has logged in to the job processing apparatus.

* * * * *